(12) United States Patent
Niiyama

(10) Patent No.: US 8,344,834 B2
(45) Date of Patent: Jan. 1, 2013

(54) INPUT APPARATUS

(75) Inventor: Takashi Niiyama, Yao (JP)

(73) Assignee: Hosiden Corporation, Yao-shi (JP)

( * ) Notice: Subject to any disclaimer, the term of this patent is extended or adjusted under 35 U.S.C. 154(b) by 134 days.

(21) Appl. No.: 12/972,922

(22) Filed: Dec. 20, 2010

(65) Prior Publication Data
US 2011/0175692 A1 Jul. 21, 2011

(30) Foreign Application Priority Data

Jan. 15, 2010 (JP) .................... 2010-007281

(51) Int. Cl.
*H01H 9/00* (2006.01)
*G06F 3/02* (2006.01)

(52) U.S. Cl. ........ 335/207; 335/205; 335/206; 345/172; 345/161

(58) Field of Classification Search .......... 335/205–207; 345/172, 161
See application file for complete search history.

(56) References Cited

U.S. PATENT DOCUMENTS

| | | | | |
|---|---|---|---|---|
| 4,458,226 A | * | 7/1984 | Cho | 335/205 |
| 4,459,578 A | * | 7/1984 | Sava et al. | 338/128 |
| 4,723,458 A | * | 2/1988 | Blok | 74/471 |
| 6,501,458 B2 | * | 12/2002 | Baker et al. | 345/161 |
| 7,595,712 B2 | * | 9/2009 | Nishino et al. | 335/207 |
| 8,164,405 B2 | * | 4/2012 | Hsu et al. | 335/205 |
| 2002/0104743 A1 | * | 8/2002 | Niiyama | 200/18 |
| 2008/0284549 A1 | * | 11/2008 | Bedell | 335/170 |
| 2010/0090689 A1 | * | 4/2010 | Furuki et al. | 324/207.24 |

FOREIGN PATENT DOCUMENTS

| | | | |
|---|---|---|---|
| JP | 2001135196 A | * | 5/2001 |
| JP | 2004-288459 A1 | | 10/2004 |

* cited by examiner

*Primary Examiner* — Mohamad Musleh
(74) *Attorney, Agent, or Firm* — Kratz, Quintos & Hanson, LLP

(57) ABSTRACT

The invention provides an input apparatus An input apparatus according to the present invention includes: an operating member, operable to move in at least X and −X directions from a neutral position; first and second magnets, being arranged with spacing along an X and −X direction and having opposite magnetic polarities to each other, wherein when the operating member moves in either one of the two directions, the first and second magnets moves in the same direction as the operating member; and a first magnetic sensor, provided at a position displaced from a middle point between the two magnets when the operating member is located in the neutral position, the position being equidistant from the two magnets. When the operating member moves in one of the two directions, the first magnetic sensor outputs a signal in accordance with the magnetic polarity of one of the first and second magnets.

27 Claims, 13 Drawing Sheets

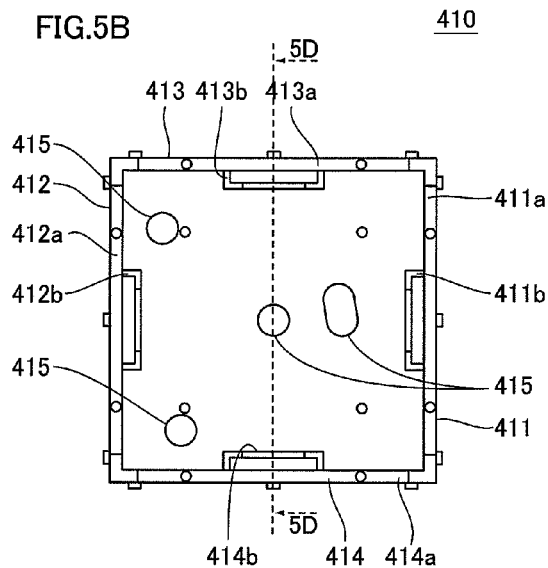
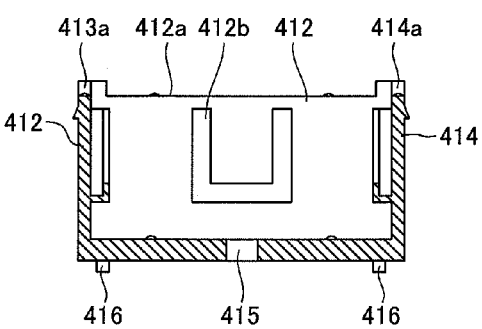
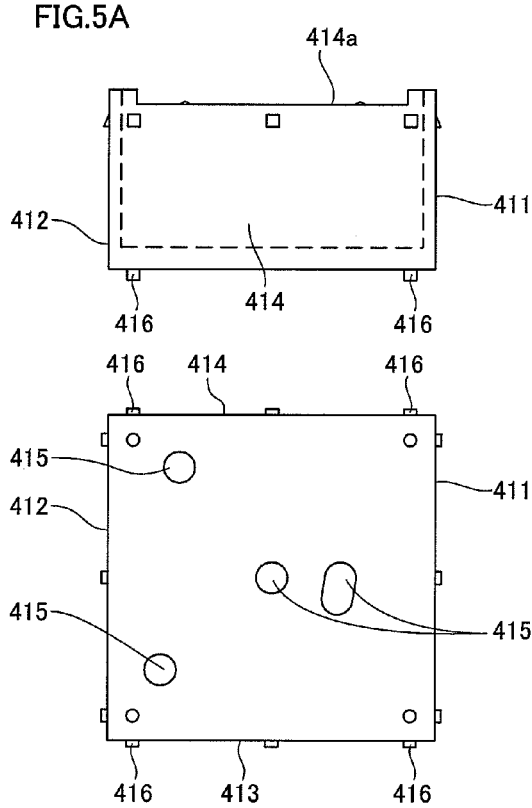

INPUT APPARATUS

The present application claims priority under 35 U.S.C. §119 of Japanese Patent Application No. 2010-007281 filed on Jan. 15, 2010, the disclosure of which is expressly incorporated by reference herein in its entity.

BACKGROUND OF THE INVENTION

1. Technical Field

The present invention relates to input apparatuses that can be operated to move at least in X, and −X directions.

2. Background Art

A conventional input apparatus of this types, as disclosed in Japanese Unexamined Patent Publication No. 2004-288459, has a first detector to detect movement in X, −X, Y and −Y directions of an operating member operated, and a second detector to detect press operation of the operating member. The first detector has four magnets, provided at positions corresponding to the X, −X, Y and −Y directions in a base of the operating member, and four Hall-effect devices arranged on a printed circuit board so as to correspond to the magnets.

CITATION LIST

Patent Literature 1: Japanese Unexamined Patent Publication No. 2004-288459

SUMMARY OF INVENTION

The above conventional apparatus requires four magnets and four Hall-effect devices in the first detector. With such configuration, the apparatus has a larger number of components, resulting in increased costs of the multiple-operation type input apparatus.

The present invention is devised in view of the above-described circumstances. The invention provides an input apparatus that can be manufactured with a reduced number of magnetic sensors and in a reduced cost.

An input apparatus according to the present invention includes: an operating member, operable to move in at least X and −X directions from a predetermined neutral position, the X and −X directions being opposite to each other; first and second magnets, being arranged with spacing along an X and −X direction and having opposite magnetic polarities to each other, wherein when the operating member moves in either one of the X and −X directions, the first and second magnets moves in the same direction as the operating member; and a first magnetic sensor, provided at a position displaced from a middle point between the first magnet and the second magnet when the operating member is located in the neutral position, the position being equidistant from the first magnet and the second magnet. When the operating member moves in one of the X and −X directions, the first magnetic sensor outputs a signal in accordance with the magnetic polarity of one of the first and second magnets that approaches the first magnetic sensor.

According to this aspect of the invention, when the operating member moves in one of the opposite directions, one of the first and second magnets approaches the first magnetic sensor, and the first magnetic sensor outputs a signal in accordance with the magnetic polarity of the one of the first and second magnets. It is thus possible to detect movements of the operating member in the two directions with a single sensor (i.e. the first magnetic sensor), the number of magnetic sensors can be reduced as compared with the conventional example. Consequently, the invention makes it possible to reduce the number of components, simplify the configuration of the input apparatus, and thereby reduce the cost of the input apparatus.

When the operating member is also operable to move from the neutral position in Y and −Y directions that are opposite to each other and perpendicular to the X and −X directions, the input apparatus may further include: third and fourth magnets, being arranged with spacing along a Y and −Y direction and having opposite magnetic polarities to each other, wherein when the operating member moves in either one of the Y and −Y directions, the third and fourth magnets moves in the same direction as the operating member; and a second magnetic sensor, provided at a position displaced from a middle point between the third magnet and the fourth magnet when the operating member is located in the neutral position, the position being equidistant from the third magnet and the fourth magnet. When the operating member moves in one of the Y and −Y directions, the second magnetic sensor may output a signal in accordance with the magnetic polarity of one of the third and fourth magnets that approaches the second magnetic sensor.

According to this aspect of the invention, when one of the first and second magnets approaches the first magnetic sensor in accordance with the movement in one of the X and −X directions of the operating member, the first magnetic sensor outputs a signal in accordance with the magnetic polarity of the one of the first and second magnets. When one of the third and fourth magnets approaches the second magnetic sensor in accordance with the movement in one of the Y and −Y directions of the operating member, the second magnetic sensor outputs a signal in accordance with the magnetic polarity of the one of the third and fourth magnets. It is thus possible to detect movements of the operating member in the X, −X, Y and −Y directions with two magnetic sensors (i.e. the first and second magnetic sensors), and the number of the magnetic sensors can be reduced as compared with the conventional example. Consequently, this aspect of the invention makes it possible to reduce the number of components, simplify the configuration of the input apparatus, and thereby reduce the cost of the input apparatus.

The input apparatus may further include first, second, third and fourth side walls, arranged on the X, −X, Y and −Y direction sides, respectively, of the operating member; and first, second, third and fourth biasing means, interposed between the operating member and the first, second, third and fourth side walls, respectively, to bias the operating member to the neutral position. In this aspect of the invention, when the operating member is operated to move in the X, −X, Y, and −Y directions from the neutral position, the first, second, third and fourth biasing means are compressed between the operating member and the first, second, third and fourth side walls. Thus, the increased biasing force of the first, second, third, and fourth biasing means serves to return the operating member to the neutral position. Moreover, as the first, second, third, and fourth biasing means are used to bias the operating member from the X, −X, Y and −Y directions, it is possible to adjust the operation feel and the stroke of the operating member by replacing the first, second, third, and fourth biasing means. It is also possible to provide different operation feel for operation in a certain direction(s) of the operating member from operation in the other directions by replacing one or some of the biasing means with ones of different biasing force than the others.

The input apparatus may further include a first slider, receiving therethrough the operating member, and being movable in the X and −X directions in accordance with the movement in the X and −X directions of the operating member; and a second slider, receiving therethrough the operating member, and being movable in the Y and −Y directions in accordance with the movement in the Y and −Y directions of the operating member. The first and second magnets may be disposed in the first slider with spacing along the X and −X direction. The third and fourth magnets may be disposed in the second slider with spacing along the Y and −Y direction.

According to this aspect of the invention, when the first and second magnets approach the first magnetic sensor in accordance with the movement in the X and −X directions of the operating member, the first magnetic sensor outputs signals in accordance with the magnetic polarities of the first and second magnets, and when the third and fourth magnets approach the second magnetic sensor in accordance with the movement in the Y and −Y directions of the operating member, the second magnetic sensor outputs signals in accordance with the magnetic polarities of the third and fourth magnets. It is thus possible to detect movements of the operating member in the X, −X, Y and −Y directions with two magnetic sensors (i.e. the first and second magnetic sensors), and the number of the magnetic sensors can be reduced as compared with the conventional example. Consequently, this aspect of the invention makes it possible to reduce the number of components, simplify the configuration of the input apparatus, and thereby reduce the cost of the input apparatus.

Alternatively, the input apparatus may further include a first slider, receiving therethrough the operating member, and being movable in the X and −X directions in accordance with the movement in the X and −X directions of the operating member; and a second slider, receiving therethrough the operating member, and being movable in the Y and −Y directions in accordance with the movement in the Y and −Y directions of the operating member; and a third slider, combined with the first slider in such a manner as to be movable in the Y and −Y directions, and combined with the second slider in such a manner as to be movable in the X and −X directions. The third slider may be movable in the X and −X directions in accordance with the movement in the X and −X directions of the first slider and movable in the Y and −Y directions in accordance with the movement in the Y and −Y directions of the second slider. The first and second magnets may be disposed in the third slider with spacing along the X and −X direction. The third and fourth magnets may be disposed in the third slider with spacing along the Y and −Y direction.

The input apparatus may further include first, second, third and fourth side walls, arranged on the X, −X, Y and −Y direction sides, respectively, of the operating member; a first biasing means, interposed between the first side wall and the first slider to bias the first slider in the −X direction; a second biasing means, interposed between the second side wall and the first slider to bias the first slider in the X direction; a third biasing means, interposed between the third side wall and the second slider to bias the second slider in the −Y direction; and a fourth biasing means, interposed between the fourth side wall and the second slider to bias the second slider in the Y direction. In this case, when the operating member is operated to move in the X and −X directions from the neutral position, the first and second biasing means are compressed between the first slider and the first and second side walls, respectively. The compressed first and second biasing means have increased biasing force to return the operating member to the neutral position. When the operating member is operated to move in the Y and −Y directions from the neutral position, the third and fourth biasing means are compressed between the second slider and the third and fourth side walls. The compressed third and fourth biasing means have increased biasing force to return the operating member to the neutral position. Moreover, as the first, second, third, and fourth biasing means bias the operating member from the X, −X, Y and −Y directions via the first and second sliders, it is possible to adjust the operation feel and the stroke of the operating member by replacing the first, second, third, and fourth biasing means. It is also possible to provide different operation feel for operation in a certain direction (s) of the operating member from operation in the other directions by adopting one or some of the biasing means with different biasing force than the others.

The first, second, third and fourth biasing means may each have a base, a movable portion and a support portion. The support portion may be provided on the base to support the movable portion. In accordance with the movement of the operating member, the support portion may be elastically deformable to displace the movable portion toward the base. In this case, by elastically deforming the support portion in accordance with the movement of the operating member and displacing the movable portion toward the base, operation feel (tactile click feel) is produced in the operation of the operating member in the X, −X, Y and −Y directions. Consequently, this aspect of the invention improves the operability of the operating member.

When the operating member is press operable from the neutral position in a −Z direction perpendicular to the X, −X, Y and −Y directions, the input apparatus may further includes: a fifth biasing means for biasing the operating member in a Z direction that is opposite to the −Z direction; a fifth magnet, provided at a −Z direction side end of the operating member or in the fifth biasing means, the fifth magnet being movable in the −Z direction in accordance with the movement in the −Z direction of the operating member; and a third magnetic sensor, disposed on the −Z direction side of the fifth magnet, and adapted to output a signal according to change in a magnetic field of the fifth magnet when the fifth magnet moves in the −Z direction. In this case, the operating member press-operated is returned to the neutral position by the biasing force of the fifth biasing means. Moreover, as the fifth biasing means biases the operating member from the −Z direction side, it is possible to adjust the force required to operate the operating member and the stroke of the operating member by replacing the fifth biasing means.

The fifth biasing means may have a base, a movable portion, and a support portion. The support portion may be provided on the base to support the movable portion. In accordance with the movement of the operating member, the support portion may elastically deform to displace the movable portion toward the base. In this case, by elastically deforming the support portion in accordance with the movement of the operating member and displacing the movable portion toward the base, operation feel (tactile click feel) is produced in the press-operation of the operating member. Consequently, this aspect of the invention improves the operability of the operating member.

When the operating member is operable to rotate in a circumferential direction thereof, the input apparatus may further includes: a plurality of sixth magnets, having alternating magnetic polarities arranged annularly along the circumferential direction, and being rotatable in accordance with the rotation of the operating member; and a fourth magnetic sensor, disposed at a distance from a part of a rotation track of the sixth magnets and adapted to output a signal in accordance with change in a magnetic field of the six magnets rotated. Moreover, the input apparatus may have a seventh magnet in place of the sixth magnets. The seventh magnet may be a ring body magnetized with alternating magnetic polarities along the circumferential direction and rotatable in accordance with the rotation of the operating member. If the seventh magnet is used, the fourth magnetic sensor may output a signal in accordance with change in a magnetic field of the seventh magnet rotated.

In either of the above cases, as the first, second, third, fourth, fifth, and sixth/seventh magnets are not in contact with the first, second, third and fourth magnetic sensors, these aspects of the invention can advantageously eliminate electrical connections between the magnets and the magnetic sensors, which prevents deterioration of reliability due to contact failure or the like. Further, the invention independently provides the first, second, third and fourth magnets and the first and second magnetic sensors to detect the movement in the X, −X, Y and −Y directions of the operating member, and the fifth magnet and the third magnetic sensor to detect the press movement of the operating member, and the sixth magnets or the seventh magnet and the fourth magnetic sensor to detect the rotation movement of the operating member. Such configuration makes it possible to flexibly adjust the dimensions and/or the sensitivity of each magnet and each magnetic sensor.

The input apparatus may further include a rotating member, which may rotate in the circumferential direction in accordance with the rotation of the operating member. If the rotating member is provided, the sixth magnets or the seventh magnet may be attached to the rotating member.

The third slider may have a box portion of rectangular tubular shape. The operating member may have a generally rectangular plate to be placed on the box portion, the plate having a substantially identical outer shape as that of the box portion. The second slider may have a slide portion, which is to be set on the plate, and a pair of arms provided in the slide portion. The first slider may have a slide portion, which is to be set on the slide portion of the second slider, and a pair of arms provided in its slide portion. The arms of the second slider may be abuttable on outer surfaces on the Y and −Y direction sides of the box portion and the plate, and the arms of the first slider may be abuttable on outer surfaces on the X and −X direction sides of the box portion and the plate. Alternatively, the arms of the second slider may be abuttable on outer surfaces on the X and −X direction sides of the box portion and the plate, and the arms of the first slider may be abuttable on outer surfaces on the Y and −Y direction sides of the box portion and the plate. In this case, the operating member, the first, second and third sliders can be combined simply by layering the plate of the operating member, the slide portion of the second slider and the slide portion of the first slider in this order, and thereby bringing the arms of the second slider into abutment with the outer surfaces on the Y and −Y direction sides or on the X and −X direction sides of the box portion and the plate, and bringing the arms of the first slider into abutment with the outer surfaces on the X and −X direction sides or on the Y and −Y direction sides of the box portion and the plate. Consequently, this aspect of the invention is advantageous in the ease of combining the operating member, and the first, second and third sliders, and in the reduction of manufacturing cost.

The operating member may further include a shaft that passes through the plate thereof in a rotatable manner in the circumferential direction. A −Z direction side end of the shaft and the rotating member may be contained in the box portion of the third slider. In this case, as compared with a case where the −Z direction side end of the shaft and the rotating member are arranged in parallel to the third slider in the Z or −Z direction, the invention is advantageous in reducing the height of the input apparatus.

The fifth biasing means may be located between the operating member and the rotating member. In this case, a −Z direction side end of the shaft, the fifth biasing means, and the rotating member may be contained in the box portion of the third slider. In this case, as compared with a case where the −Z direction side end of the shaft, the fifth biasing means and the rotating member are arranged in parallel to the third slider in the Z or −Z direction, the invention is advantageous in reducing the height of the input apparatus.

The input apparatus may further include a circuit board provided on the −Z direction side of the operating member. In this case, the first, second, third and fourth magnetic sensors may be mounted on the circuit board.

BRIEF DESCRIPTION OF DRAWINGS

FIG. 5A is a schematic front view of a case of the input apparatus; FIG. 5B is a schematic plan view of the case of the input apparatus; FIG. 5C is a schematic bottom view of the case of the input apparatus; and FIG. 5D is a cross-sectional view, taken along line 5D-5D in FIG. 5A.

DESCRIPTION OF EMBODIMENTS

Figure 1:
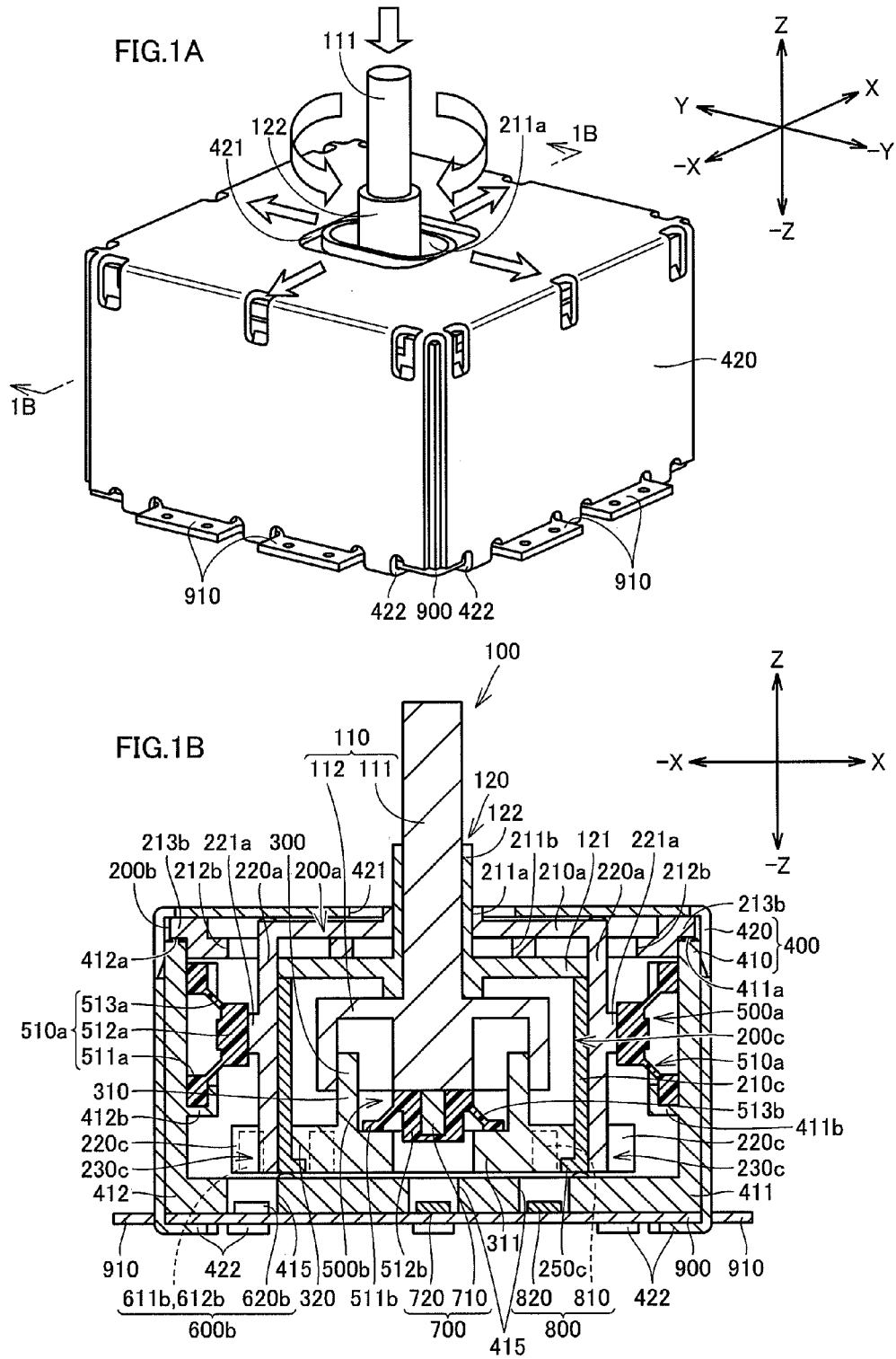
FIG. 1A is a schematic perspective view of an input apparatus according to an embodiment of the present invention.
FIG. 1B is a cross-sectional view, taken along line 1B-1B in FIG. 1A.

An input apparatus according to an embodiment of the present invention will be described below referring to FIGS. 1 to 12. The input apparatus as shown in FIGS. 1A and 1B is a multiple operation-type input apparatus having a slide operation input function enabling an operating member 100 to perform slide operation input in eight directions of X, −X, Y, −Y, XY, −X-Y, X-Y, −XY from a neutral position, a press operation input function enabling the operating member 100 to perform press operation input in a −Z direction from the neutral position, and a rotation operation input function enabling the operating member 100 to perform rotational operation input in a circumferential direction. The input apparatus has the operating member 100, first, second and third sliders 200a, 200b, 200c, a rotating member 300, a case 400, first and second neutral position returning mechanisms 500a, 500b, first and second slide detectors 600a, 600b, a press detector 700, a rotation detector 800, and a circuit board 900. Each of these elements will be described below in detail. It is defined in the present embodiment that the X and −X directions are opposite to each other, and that the Y and −Y directions are perpendicular to the X and −X directions and opposite to each other; and that the Z and −Z directions are opposite to each other and perpendicular to the X, −X, Y and −Y directions.

The circuit board 900 is a well-known printed circuit board as shown in FIGS. 1A to 3 and FIG. 6C. The circuit board 900 is a generally rectangular board, on four sides of which there are a plurality of terminals 910 projecting for external connection. The terminals 910 are directly connected or indirectly connected through the use of lead wires or the like to a main substrate or the like of an electronic equipment. Moreover, positioning holes 920 are provided at four corners of the circuit board 900. The electronic equipment has the present input apparatus installed therein.

As shown in FIGS. 1A to 5D, the case 400 has a body 410 and a cover 420. The body 410 is a bottomed, generally rectangular tuboid article of plastic material formed by injection molding. The body 410 is to be placed on the circuit board 900 and has a bottom plate and four side walls 411, 412, 413, 414 (first, second, third, fourth side walls). The side walls 411, 412, 413, 414 are rectangular plates extending upright from respective four sides of the bottom plate of the body 410, such that the side walls are arranged on the X, −X, Y, −Y direction sides around the operating member 100. Upper ends of the side walls 411, 412, 413, 414 are provided with guide recesses 411a, 412a, 413a, 414a. The guide recesses 411a, 412a extend in the Y and −Y direction, respectively, and the guide recesses 413a, 414a extend in the X and −X direction, respectively. A pair of upward projections is provided on the bottom of each of the guide recesses 411a, 412a, 413a, 414a, as shown in FIGS. 5A and 5B. Moreover, holders 411b, 412b, 413b, 414b are provided on inner surfaces of the side walls 411, 412, 413, 414. The holders 411b, 412b, 413b, 414b are generally U-shaped pockets having a substantially L cross-sectional shape (refer to FIG. 1B). The bottom plate of the body 410 has four containing holes 415 formed through the thickness thereof as shown in FIGS. 5B and 5C. The containing holes 415 are used to contain magnetic sensors 620a, 620b of the first and second slide detectors 600a, 600b, a magnetic sensor 720 of the press detector 700, and a magnetic sensor 820 of the rotation detector 800. The bottom plate of the body 410 also has four bosses 416 projecting downward. The bosses 416 are to fit in the positioning holes 920 of the circuit board 900.

Figure 2:
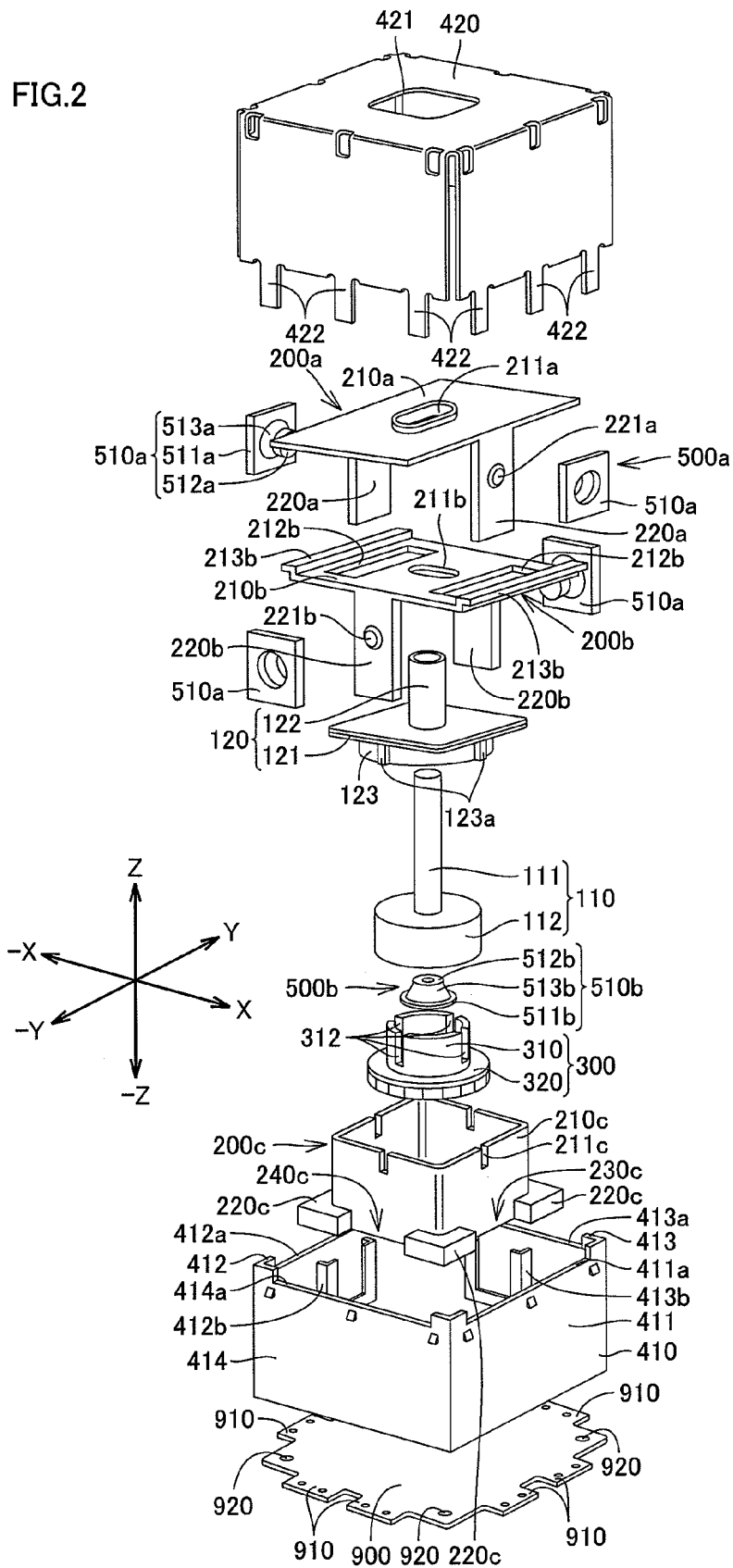
FIG. 2 is an exploded perspective view of the input apparatus as seen from above.

As shown in FIGS. 1A to 3, the cover 420 is a generally rectangular cup body to cover the body 410 and has a top plate and four side walls. The top plate of the cover 420 has a generally rectangular opening 421. Four sidewalls extend downward from the four sides of the top plate, and the lower end of each of the four sidewalls is provided with a plurality of locking pieces 422. These locking pieces 422 are each bent into an L shape generally. When they are brought into abutment with a back surface of the circuit board 900, the cover 420 and the body 410 are fixed onto the circuit board 900. It should be appreciated that the locking pieces 422 illustrated in FIG. 2 are yet to be bent.

Figure 6A:
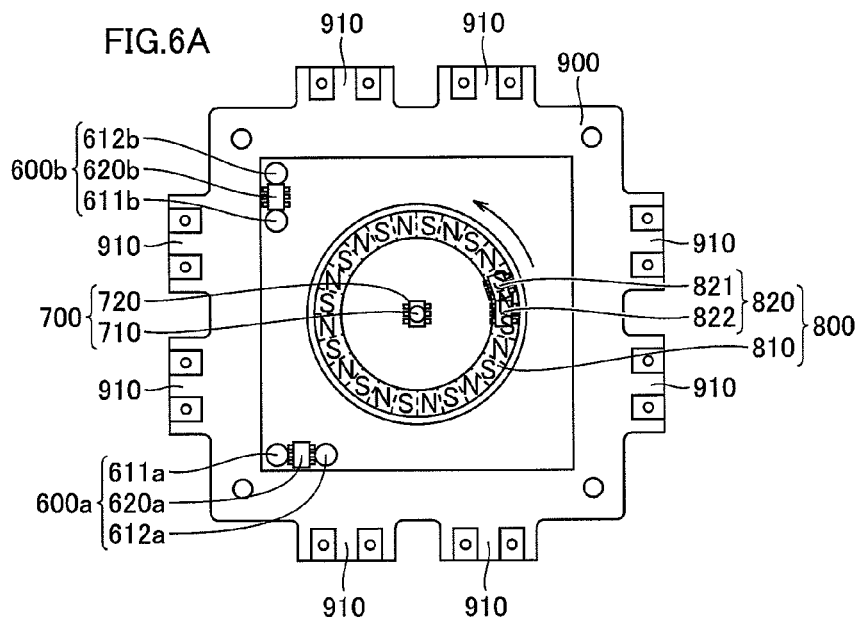
FIG. 6A is a schematic plan view showing positional relationships between first, second, third, fourth, fifth and seventh magnets, and first, second, third and fourth magnetic sensors of the input apparatus.
Figure 6B:
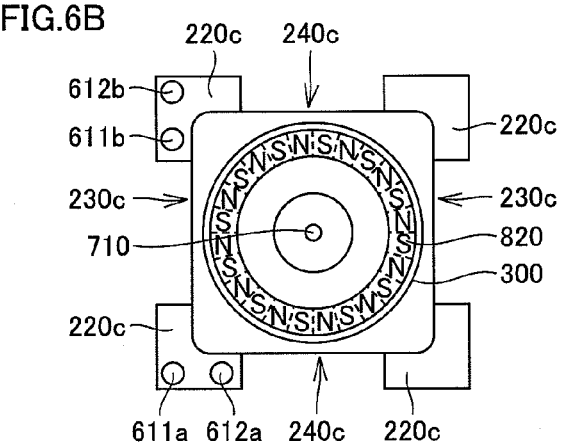
FIG. 6B is a schematic plan view showing the positional relationship between the third slider and the rotating member, and the first, second, third, fourth, fifth and seventh magnets of the input apparatus.
Figure 6C:
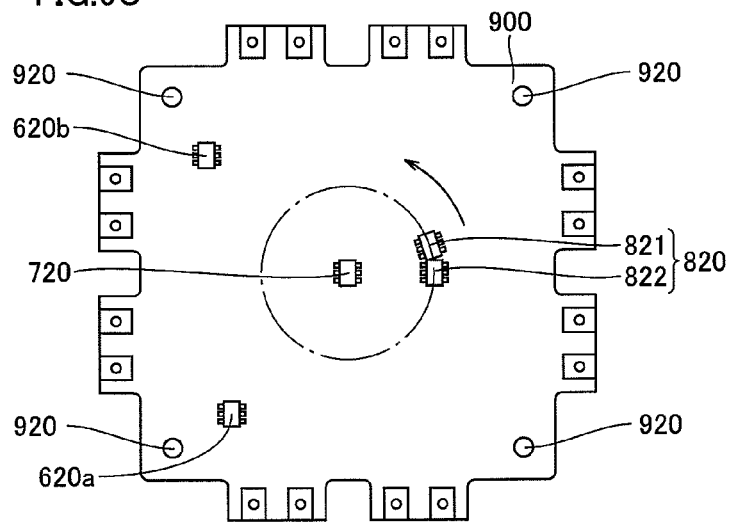
FIG. 6C is a schematic plan view showing the positional relationship of the first, second, third and fourth magnetic sensors on a circuit board of the input apparatus.

As shown in FIGS. 1B to 4A, the third slider 200c is contained in the body 410 to be placed on projections of the bottom plate of the body 410, in a slidable manner along the circuit board 900. The third slider 200c consists of a bottomed rectangular tuboid box portion 210c and four generally rectangular flanges 220c projecting at four corners of the lower end of the box portion 210c. As shown in FIGS. 4B and 6B, a gap 230c exists between each set of two flanges 220c along the Y and −Y direction, and a gap 240c exists between each set of two flanges 220c along the X and −X direction. Moreover, the bottom of the box portion 210c has a circular through-hole. A rim area 250c of the through-hole of the box portion 210c and the flanges 220c are to be placed on the projections of the bottom plate of the body 410, as shown in FIG. 1B.

Figure 3:
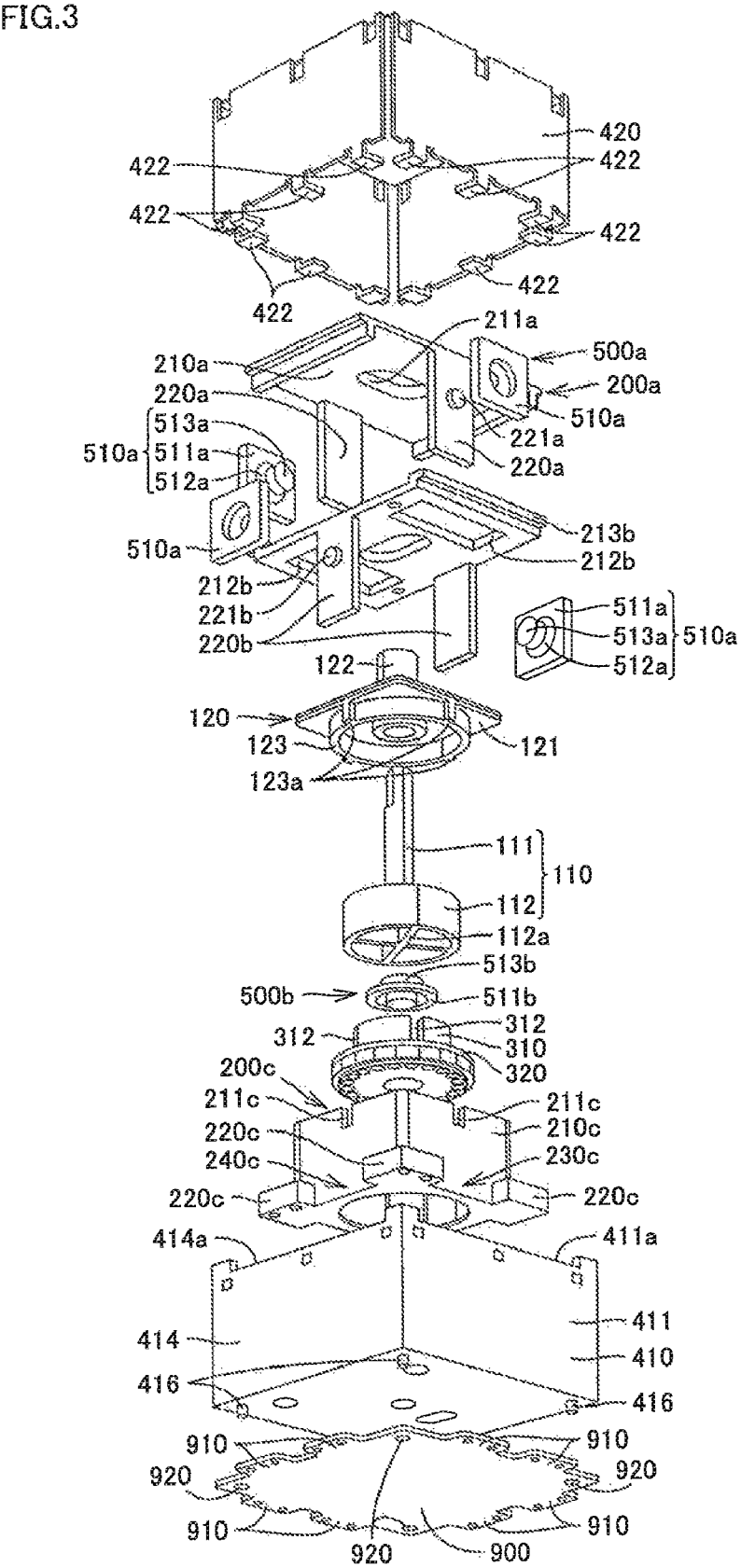
FIG. 3 is an exploded perspective view of the input apparatus as seen from below.

The rotating member 300 is accommodated in the third slider 200c, as shown in FIGS. 1B to 3. The rotating member 300 consists of a tubular portion 310 and a ring-shaped brim 320 surrounding the lower end of the tubular portion 310. The outer edge of the brim 320 is rotatably supported on the rim area 250c of the third slider 200c. Moreover, a ring-shaped mounting portion 311 is provided along the lower end of the inner circumferential surface of the tubular portion 310. The mounting portion 311 has a circular through-hole in its center. Guide recesses 312 are formed in an upper portion of the tubular portion 310, as shown in FIGS. 2 and 3.

The operating member 100 includes a shaft 110 and a fixing portion 120, as shown in FIGS. 1B to 3. The fixing portion 120 has a generally rectangular plate 121, a tubular guide portion 122 penetrating the plate 121 in its thickness direction, and a annular portion 123 provided in a lower surface of the plate 121. The plate 121 is a plate body whose outer shape is substantially the same as that of the box portion 210c of the third slider 200c. That is, outer edges of the plate 121 are placed on an upper end of the box portion 210c of the third slider 200c so as to serve as a lid to cover an upper opening of the box portion 210c. The annular portion 123 has four locking projections 123a disposed radially. The locking projections 123a are to be inserted into locking recesses 211c of the box portion 210c. The shaft 110 consists of a cylindrical body 111 and a circular inverted cupped coupling portion 112 provided at the lower end of the body 111. The body 111 is inserted into the guide portion 122 movably in the Z and –Z directions and rotatably in the circumferential direction. The body 111 and the guide portion 122 passes through long holes 211a, 211b (to be described) of the first and second sliders 200a, 200b and the opening 421 of the cover 420, so that the body 111 and the guide portion 122 project outside the input apparatus to be operated. It is defined in the present invention that the operating member 100 is at the "neutral position" when a shaft center of the body 111 substantially coincides with that of the opening 421 of the cover 420. The operating member 100 is slide operable from the neutral position in any direction therearound. Moreover, an inner diameter of the coupling portion 112 is slightly larger than an outer diameter of the cylindrical portion 310 of the rotating member 300. That is, the cylindrical portion 310 inserted into the coupling portion 112 is movable in the Z and –Z directions. The coupling portion 112 is provided with a cross-shaped projection 112a therein, as shown in FIG. 3. A central portion of the cross-shaped projection 112a is placed on the mounting portion 311 of the rotating member 300, with a rubber 510b of the second neutral position returning mechanism 500b interposed therebetween. Moreover, end portions of the cross-shaped projection 112a are received in the guide recesses 312 of the cylindrical portion 310 in a movable manner in the Z and –Z directions. As a result, the shaft 110 is movable in the Z and –Z directions with respect to the rotating member 300, and the shaft 110 is rotatable in the circumferential direction together with the rotating member 300.

The second neutral position returning mechanism 500b has the rubber 510b (fifth biasing means) to be interposed between the lower end (cross-shaped projection 112a) of the shaft 110 of the operating member 100 and the mounting portion 311 of the rotating member 300. The rubber 510b has a ring-shaped base 511b, a columnar movable portion 512b of a smaller outer diameter than an inner diameter of the base 511b, and a cylindrical support portion 513b whose diameter is gradually decreased upward. The support portion 513b is provided along an inner edge of the base 511b. The movable portion 512b is provided on top of the support portion 513b. That is, the support portion 513b supports the movable portion 512b above the base 511b. The base 511b is placed on the mounting portion 311. The movable portion 512a abuts the lower end (the cross-shaped projection 112a) of the shaft 110 to support the shaft 110. When moving the shaft 110 in the –Z direction, the rubber 510b is compressed between the lower end of the shaft 110 (cross-shaped projection 112a) and the mounting portion 311 of the rotating member 300, the support portion 513b is elastically deformed and bent, so that the movable portion 512b is displaced to the base 511b side. The rubber 510b thus has a biasing force to bias the shaft 110 in the Z direction. This biasing force is used to return the shaft 110 operated in –Z direction to the neutral position. Moreover, the bending of the support portion 513b and the displacement of the movable portion 512b provide tactile click feel in the press operation in the –Z direction of the operating member 100. It is defined in the present embodiment that the operating member 100 is in the neutral position in the –Z direction operation when its shaft 110 supports the rubber 510b that is not deformed.

The second slider 200b has a long plate-like slide portion 210b extending in the X and –X direction, as shown in FIGS. 1B, 2, 3, 4A and 4B. The slide portion 210b is placed on the plate 121 of the operating member 100. In the center of the slide portion 210b, there is formed the long hole 211b extending in the X and –X direction. On opposite sides of the long hole 211b of the slide portion 210b is provided a pair of rectangular receiving holes 212b extending in the Y and –Y direction. The receiving holes 212b each have such a width as to allow movement in the X and –X directions of arms 220a (to be described) of the first slider 200a. On the other hand, the first slider 200a has a long plate-like slide portion 210a extending in the Y and –Y direction, as shown in FIGS. 1B, 2, 3, 4A and 4C. The slide portion 210a is disposed on the slide portion 210b of the second slider 200b, perpendicularly with respect to the slide portion 210b. In the center of the slide portion 210b, there is formed the long hole 211b extending in the Y and –Y direction. The centers of the long holes 211a, 211b and the opening 421 of the cover 420 coincide with one another when the operating member 100 is located at the neutral position.

Figure 4A:
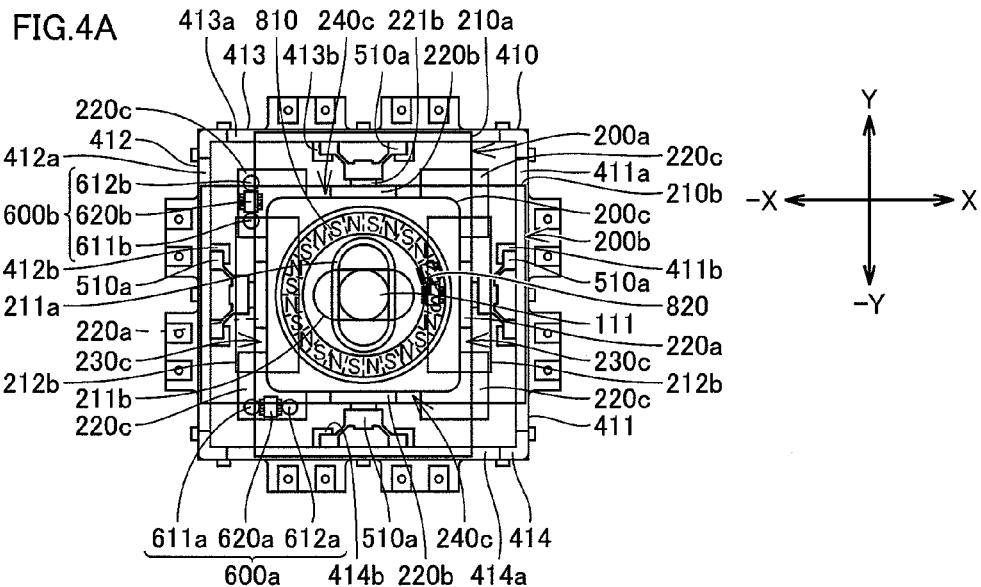
FIG. 4A is a schematic plan view of the input apparatus with its cover removed, showing first, second and third sliders transparently.
Figure 4B:
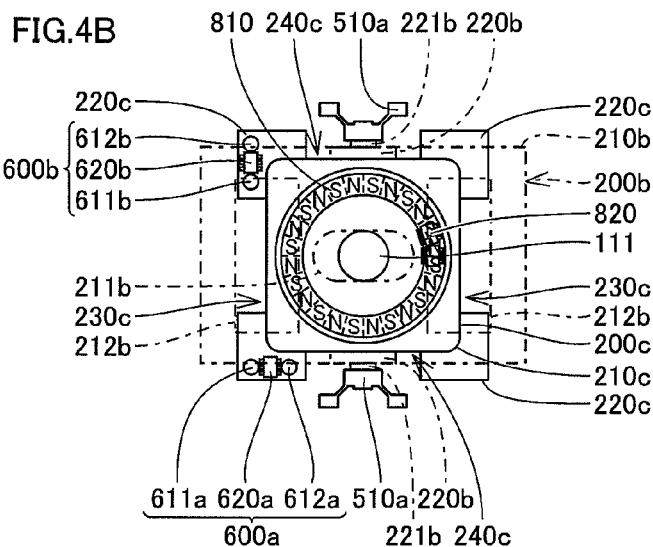
FIG. 4B is a schematic plan view showing a positional relationship between the second and third sliders with the first slider further removed.
Figure 4C:
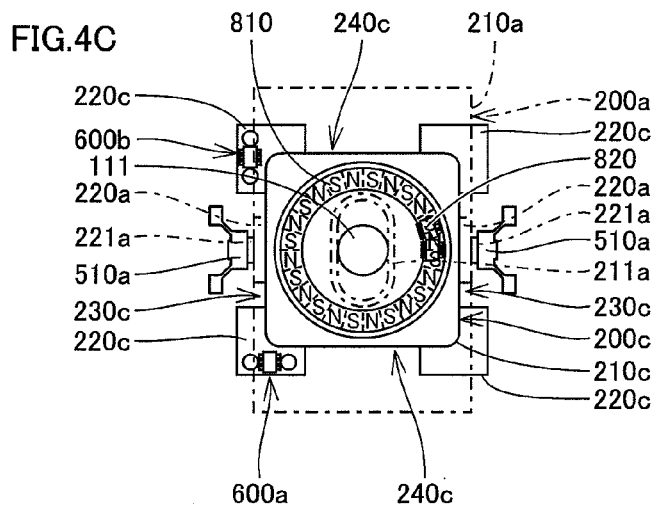
FIG. 4C is a schematic plan view showing a positional relationship between the first and third sliders with the second slider removed in place of the first slider.

An ascending step 213b is provided at each opposite lengthwise end (each end in the X and –X direction) of the slide portion 210b, as shown in FIGS. 1B, 2 and 3. The ascending steps 213b are received in the guide recesses 411a, 412a of the side walls 411, 412 of the body 410 to be guided movably in the Y and –Y directions between the projections of the guide recesses 411a, 412a and the top plate of the cover 420. The ascending steps 213b are thus guided to allow the slide portion 210b to slidingly move in the Y and –Y directions inside the case 400. On the other hand, as shown in FIG. 4A, the lengthwise ends (ends in the Y and –Y direction) of the slide portion 210a are received in the guide recesses 413a, 414a of the side walls 413, 414 of the body 410 to be guided movably in the X and –X directions between the projections of the guide recesses 413a, 414a and the top plate of the cover 420. The slide portion 210a is thus slidingly movable in the X and –X directions inside the case 400.

The opposite widthwise ends (ends in the Y and –Y direction) of the slide portion 210b of the second slider 200b are provided with a pair of arms 220b as shown in FIGS. 2, 3, 4A and 4B. The arms 220b extend downward along outer surfaces in the Y and –Y direction of the box portion 210c of the third slider 200c, and distal ends of the arms 220b are to be received in the respective gaps 240c on the Y and –Y direction sides of the third slider 200c. The arms 220b abut outer surfaces in the Y and –Y direction of the plate 121 of the operating member 100 and the above-mentioned outer surfaces of the box portion 210c of the third slider 200c, so that the arms 220b are movable along the outer surfaces of the plate 121 and the outer surfaces of the box portion 210c in the X and –X directions. Moreover, the distal ends of the arms 220b are movable in the X and –X directions inside the gaps 240c of the third slider 200c. In summary, the second slider 200b is combined with the plate 121 of the operating member 100 and the box portion 210c of the third slider 200c, in a movable manner in the X and –X directions with respect to the plate 121 and the box portion 210c. On the other hand, the opposite widthwise ends (ends in the X and –X direction) of the slide portion 210a of the first slider 200a are provided with the pair of arms 220a as shown in FIGS. 1B, 2, 3, 4A and 4C. The arms 220a passes through the receiving holes 212b of the second slider 200b, in a movable manner in the X and –X directions and the Y and –Y directions, and extend along the outer surfaces in the X and –X direction of the box portion 210c of the third slider 200c. Distal ends of the arms 220a are to be received in the respective gaps 230c on the X and –X direction sides of the third slider 200c. The arms 220a abut outer surfaces in the X and –X directions of the plate 121 of the operating member 100, and also abut the box portion 210c of the third slider 200c so as to be movable in the Y and −Y directions along the outer surfaces of the plate 121 and the outer surfaces of the box portion 210c. The distal ends of the arms 220a are movable in the Y and −Y directions inside the gaps 230c of the third slider 200c. In summary, the first slider 200a is combined with the plate 121 of the operating member 100 and the box portion 210c of the third slider 200c, in a movable manner in the Y and −Y directions with respect to the plate 121 and the box portion 210c.

Accordingly, when the operating member 100 slidingly moves in the Y and −Y directions, the second slider 200b and the third slider 200c move in the Y and −Y directions. At this time, the plate 121 of the operating member 100 and the box portion 210c of the third slider 200c move in the Y and −Y directions between the pair of arms 220a of the first slider 200a. In other words, the pair of arms 220a of the first slider 200a moves in the −Y and Y directions along the outer surfaces in the X and −X directions of the plate 121 of the operating member 100 and the box portion 210c of the third slider 200c, and the distal ends of the arms 220a move in the −Y and Y directions inside the respective gaps 230c of the third slider 200c. It should be noted that the first slider 200a does not move in this operation. On the other hand, when the operating member 100 slidingly moves in the X and −X directions, the first slider 200a and the third slider 200c move in the X and −X directions. At this time, the plate 121 of the operating member 100 and the box portion 210c of the third slider 200c move in the X and −X directions between the pair of arms 220b of the second slider 200b. That is, the pair of arms 220b of the second slider 200b moves in the −X and X directions along the outer surfaces in the Y and −Y directions of the plate 121 of the operating member 100 and the box portion 210c of the third slider 200c, and the distal ends of the arms 220b move in the −X and X directions inside the gaps 240c of the third slider 200c. It should be noted that the second slider 200b does not move in this operation.

On an outer surface of each of the arms 220b is provided with a columnar projection 221b. On an outer surface of each of the arms 220a is provided with a columnar projection 221a.

The first neutral position returning mechanism 500a has four rubbers 510a (first, second, third and fourth biasing means). The rubbers 510a are interposed between the side wall 411 of the body 410 and the projection 221a of the arm 220a on the X direction side of the first slider 200a, between the side wall 412 of the body 410 and the projection 221a of the arm 220a on the −X direction side of the first slider 200a, between the side wall 413 and the projection 221b of the arm 220b on the Y direction side of the second slider 200b, and between the side wall 414 and the projection 221b of the arm 220b on the −Y direction side of the second slider 200b, respectively. The rubbers 510a thus bias the first and second sliders 200a, 200b from the −X, X, −Y and Y direction sides, so that the operating member 100 can be held at the neutral position by means of the first and second sliders 200a, 200b.

Each of the rubbers 510a has a ring-shaped base 511a, a disk-shaped movable portion 512a having a smaller outer diameter than an inner diameter of the base 511a, and a cylindrical support portion 513a whose diameter is gradually decreased toward a distal side. The support portion 513a is provided along the inner edge of the base 511a. The movable portion 512a is provided at a distal end of the support portion 513a. That is, the support portion 513a supports the movable portion 512a above the base 511a. The four bases 511a are to be securely received in the holders 411b, 412b, 413b, 414b of the side walls 411, 412, 413, 414, respectively. The movable portions 512a abut the projections 221a, 221b of the arms 220a and the arms 220b. When the arms 220a slidingly move in the X and −X directions, the rubbers 510a are compressed between the side walls 411, 412 of the body 410 and the projections 221a of the arms 220a, and the support portions 513a are elastically deformed and bent, so that the movable portions 512a are displaced to the base 511a side. Such displacements increase the biasing forces of the rubbers 510a to bias the projections 221a of the arms 220a in the −X and X directions. This biasing force returns the operating member 100, which has slidingly moved in the X and −X directions, to the neutral position. Similarly, when the arms 220b slidingly move in the Y and −Y directions, the rubbers 510a are compressed between the side walls 413, 414 of the body 410 and the projections 221b of the arms 220b, and the support portions 513b are elastically deformed and bent, so that the movable portions 512a are displaced to the base 511a side. Such displacements increases the biasing forces of the rubbers 510a to bias the projections 214b1 of the arms 220b in the −Y and Y directions. This biasing force returns the operating member 100, which has slidingly moved in Y and −Y directions, to the neutral position. The bending of the support portions 513a and the displacements of the movable portions 512a provide tactile click feel in the slide operation in the X, −X, Y and −Y directions of the operating member 100.

The first slide detector 600a is detection means for detecting slide movement of the operating member 100 in directions that include components of the X and −X directions, as shown in FIGS. 4A to 4C and 6A to 6C. The first slide detector 600a has magnets 611a, 612a (first and second magnets) and the magnetic sensor 620a (first magnetic sensor). The magnets 611a, 612a are columnar bodies and are magnetized in the height direction. The magnets 611a, 612a are disposed in the flange 220c on the −Y-X direction side of the third slider 200c, arranged in spaced relation to each other and linearly in the X and −X direction. The magnets 611a, 612a are opposite in magnetic polarity. More specifically, the magnet 611a is oriented with its north pole facing downward, and the magnet 612a is oriented with its south pole facing downward. The magnetic sensor 620a used in the present input apparatus is a Hall-effect device of a magnetic polarity detecting type. The magnetic sensor 620a is disposed at a position on the circuit board 900 that is below a middle point between the magnet 611a and the magnet 612a (i.e., at a position that is displaced downward from the middle point and equidistant from the magnet 611a and the magnet 612a) when the operating member 100 is located in the neutral position. When the magnet 611a approaches the magnetic sensor 620a in accordance with the slide movement of the operating member 100 including a component of the X direction, the magnetic sensor 620a outputs a first output signal in accordance with the magnetic polarity of the magnet 611a; when the magnet 612a approaches the magnetic sensor 620a in accordance with the slide movement of the operating member 100 including a component of the −X direction, the magnetic sensor 620a outputs a second output signal (i.e., a reverse signal to the first output signal in phase) in accordance with the magnetic polarity of the magnet 612a. The first and second output signals are thus outputted from the magnetic sensor 620a in accordance with the magnetic polarity (i.e., north pole or south pole) of the magnets 611a, 612a and are then inputted into the above-mentioned electronic equipment through the circuit board 900.

The second slide detector 600b is detection means for detecting slide movement of the operating member 100 in directions including components of the Y and −Y directions, as shown in FIGS. 4A to 4C and 6A to 6C. The second slide detector 600b has magnets 611b, 612b (third and fourth magnets), and the magnetic sensor 620*b* (second magnetic sensor). The magnets 611*b*, 612*b* are columnar bodies and are magnetized in the height direction. The magnets 611*b*, 612*b* are disposed in the flange 220*c* on the Y-X direction side of the third slider 200*c*, arranged in spaced relation to each other and linearly in the –Y and Y direction. The magnets 611*b*, 612*b* are opposite in magnetic polarity. More specifically, the magnet 611*b* is oriented with its north pole facing downward, and the magnet 612*b* is oriented with its south pole facing downward. The magnetic sensor 620*b* used in the present input apparatus is a Hall-effect device of a magnetic polarity detecting type. The magnetic sensor 620*b* is disposed at a position on the circuit board 900 below a middle point between the magnet 611*b* and the magnet 612*b* (i.e., at a position that is displaced downward from the middle point and equidistant from the magnet 611*b* and the magnet 612*b*) when the operating member 100 is located in the neutral position. When the magnet 611*b* approaches the magnetic sensor 620*b* in accordance with the slide movement of the operating member 100 including a component of the Y direction, the magnetic sensor 620*b* outputs a third output signal in accordance with the magnetic polarity of the magnet 611*b*; when the magnet 612*b* approaches the magnetic sensor 620*b* in accordance with the slide movement of the operating member 100 including a component of the –Y direction, the magnetic sensor 620*b* outputs a fourth output signal (i.e., a reverse signal to the third output signal in phase) in accordance with the magnetic polarity of the magnet 612*b*. The third and fourth output signals are thus outputted from the magnetic sensor 620*b* in accordance with the magnetic polarities (i.e., north pole or south pole) of the magnets 611*b*, 612*b* and are then inputted into the above-mentioned electronic equipment through the circuit board 900.

The press detector 700 is a detection unit for detecting press movement in the –Z direction of the operating member 100, as shown in FIGS. 1B and 6A to 6C. The press detector 700 has a magnet 710 (fifth magnet) and a magnetic sensor 720 (third magnetic sensor). The magnet 710 is a columnar body and is magnetized in a height direction. The magnet 710 is disposed with its north or south pole facing downward inside the movable portion 512*b* of the rubber 510*b* of the second neutral position returning mechanism 500*b*. As such, the magnet 710 is movable in the –Z direction in accordance with the displacement of the movable portion 512*b*. The magnetic sensor 720 used in the present input apparatus is a Hall-effect device of unipolar detection type. The magnetic sensor 720 is disposed at a position on the circuit board 900 below the magnet 710 (i.e., on the –Z direction side of the magnet 710) when the operating member 100 is located in the neutral position. The magnetic sensor 720 outputs a fifth output signal in accordance with change in the magnetic field in accordance with the movement of the magnet 710. The fifth output signal is inputted into the above-mentioned electronic equipment through the circuit board 900.

The rotation detector 800 is a detection unit for detecting rotation in the circumferential direction of the operating member 100 and amount of rotation thereof, as shown in FIGS. 1B and 6A to 6C. The rotation detector 800 has a magnet 810 (seventh magnet) and the magnetic sensor 820 (fourth magnetic sensor). The magnet 810 is a ring-shaped member magnetized with opposite polarities that are arranged alternately with predetermined spacing in the circumferential direction. The magnet 810 is disposed in the brim 320 of the rotating member 300. As such, the magnet 810 rotates in the circumferential direction in accordance with the rotation of the rotating member 300. The magnetic sensor 820 has Hall-effect devices 821, 822 of the unipolar detection type. The Hall-effect devices 821, 822 are disposed at a position on the circuit board 900 below a part of a rotation track of the magnets 810 (i.e., disposed with spacing below the part of the rotation track) when the operating member 100 is located in the neutral position. The magnetic sensor 820 detects change in the magnetic field of the rotating magnet 810 through the Hall-effect devices 821, 822 and outputs a rotation angle and a rotation amount of the operating member 100 as sixth and seventh output signals in two phases. The sixth and seventh output signals are inputted into the electronic equipment through the terminals for external connection 910 of the circuit board 900. As recited above, The electronic equipment has the present input apparatus installed therein.

The input apparatus having the foregoing configuration is assembled in the following steps as described below. In advance of assembly, the flanges 220*c* of the third slider 200*c* already has the magnets 611*a*, 612*a*, 611*b*, 612*b* attached thereto, the brim 320 of the rotating member 300 has the magnets 810 attached thereto, and the movable portion 512*b* of the rubber 510*b* has the magnet 710 attached thereto. Moreover, the magnetic sensors 620*a*, 620*b*, 720 and 820 are mounted on the circuit board 900 in advance.

First, the body 111 of the shaft 110 of the operating member 100 is inserted into the guide portion 122 of the fixing portion 120. Meanwhile, the rotating member 300 is set on the rim area 250*c* of the box portion 210*c* of the third slider 200*c*. Thereafter, the rubber 510*b* is inserted into the tubular portion 310 of the rotating member 300 to be placed on the mounting portion 311 of the tubular portion 310. The shaft 110 of the operating member 100 is then inserted into the box portion 210*c* of the third slider 200*c*, and the coupling portion 112 of the shaft 110 is put over the tubular portion 310 of the rotating member 300. At this point, the cross-shaped projection 112*a* of the coupling portion 112 is received in the guide recesses 312 of the tubular portion 310 to be placed on the rubber 510*b*. Along with this, the locking projections 123*a* of the operating member 100 are inserted into the locking recesses 211*c* of the box portion 210*c* of the third slider 200*c*, so that the plate 121 of the fixing portion 120 of the operating member 100 is set on the box portion 210*c*. Thereafter, the plate 121 of the operating member 100 and the box portion 210*c* of the third slider 200*c* are inserted between the pair of arms 220*b* of the second slider 200*b*, so that inner surfaces of the arms 220*b* abut the outer surfaces in the Y and –Y directions of the plate 121 and the box portion 210*c*, and the body 111 of the shaft 110 and the guide portion 122 of the fixing portion 120 in the operating member 100 are inserted into the long hole 211*b* of the slide portion 210*b* of the second slider 200*b*. Consequently, the slide portion 210*b* of the second slider 200*b* is set on the plate 121 of the operating member 100. Thereafter, the pair of arms 220*a* of the first slider 200*a* is inserted into the pair of receiving holes 212*b* of the slide portion 210*b* of the second slider 200*b*, and the plate 121 of the operating member 100 and the box portion 210*c* of the third slider 200*c* are inserted between the arms 220*a*. Consequently, the inner surfaces of the arms 220*a* abut the outer surfaces in the X and –X directions of the plate 121 and the box portion 210*c*. Along with this, the body 111 of the shaft 110 and the guide portion 122 of the fixing portion 120 in the operating member are inserted into the long hole 211*a* of the slide portion 210*a* of the first slider 200*a*. As a result, the slide portion 210*a* of the first slider 200*a* is set on the slide portion 210*b* of the second slider 200*b*. This completes the assembly of the operating member 100, the first, second and third sliders 200*a*, 200*b*, 200*c*, the rotating member 300, and the rubber 510*b*.

Then, the body 410 is set on the circuit board 900. Onto the projections of the bottom plate of the body 410, the operating member 100, the first, second and third sliders 200a, 200b, 200c, the rotating member 300, and the rubber 510b in the combined state are set. At this time, the lengthwise ends of the slide portion 210a of the first slider 200a are inserted into the guide recesses 413a, 414a of the side walls 413, 414 of the body 410, and the ascending steps 213b of the slide portion 210b of the second slider 200b are inserted into the guide recesses 411a, 412a of the side walls 411, 412 of the body 410. Thereafter, the bases 511a of the rubbers 510a are inserted into the holders 411b, 412b, 413b, 414b of the body 410, so that the movable portions 512a of the rubbers 510a abut the pairs of arms 220a, 220b of the first and second sliders 200a, 200b. Subsequently, the cover 420 is put over the body 410, and the locking pieces 422 of the cover 420 are bent to abut the lower surface of the circuit board 900. As a result, the end portions of the slide portion 210a are held movably in the X and -X directions between the guide recesses 413a, 414a and the top plate of the cover 420, and the ascending steps 211b of the slide portion 210b are held movably in the Y and -Y directions between the guide recesses 411a, 412a and the top plate of the cover 420.

The input apparatus thus assembled is operated in the following manner. Descriptions will also be made on how the respective elements work in the operation of the input apparatus.

Figure 7:
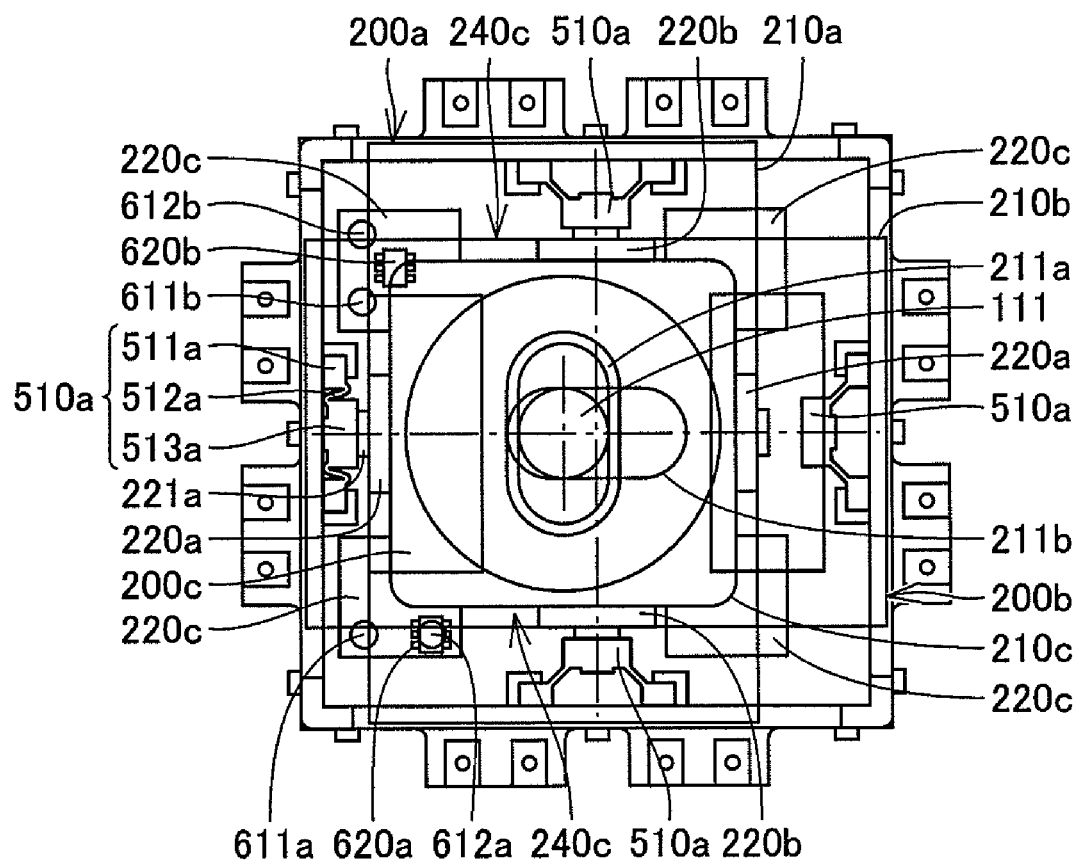
FIG. 7 is a schematic plan view of the input apparatus with its cover removed, showing the first, second and third sliders transparently, in a state where an operating member is operated to move in a −X direction.
Figure 8A:
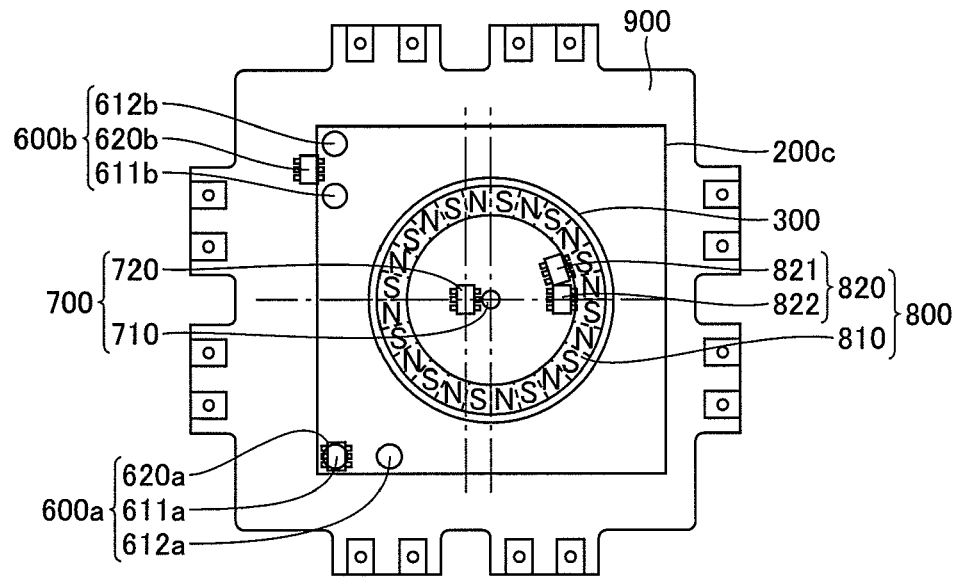
FIG. 8A is a schematic plan view showing the positional relationships between the first, second, third, fourth, fifth and seventh magnets and the first, second, third and fourth magnetic sensors, in a state where the operating member is operated to move in an X direction.
Figure 8B:
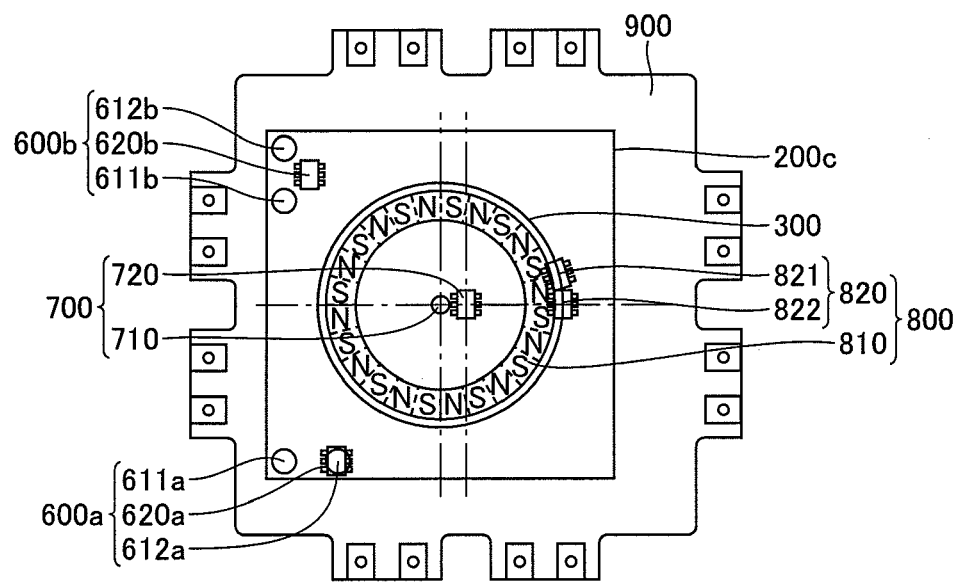
FIG. 8B is a schematic plan view showing the positional relationships between the first, second, third, fourth, fifth and seventh magnets and the first, second, third and fourth magnetic sensors in a state where the operating member is operated to move in the −X direction.

When the operating member 100 is operated to slide in the -X direction from the neutral position, as shown in FIG. 7, the first slider 200a and the third slider 200c moves in the -X direction. At this time, the box portion 210c of the third slider 200c moves in the -X direction between the pair of arms 220b of the second slider 200b, but the second slider 200b does not move. Along with this, as shown in FIG. 8B, the magnets 611a, 612a of the first slide detector 600a provided in the flange 220c of the third slider 200c move in the -X direction. Specifically, the magnet 612a approaches the magnetic sensor 620a to be aligned with the same in a vertical direction, while the magnet 611a moves away from the magnetic sensor 620a. The magnetic sensor 620a therefore outputs a second output signal in accordance with the magnetic polarity of the magnet 612a. When the second output signal is inputted into the above-mentioned electronic equipment, the slide operation of the operating member 100 in the -X direction is detected by a control unit of the electronic equipment. At this time, as shown in FIG. 7, the rubber 510a is compressed between the arm 220a on the -X direction side of the first slider 200a and the side wall 412 of the body 410, so that the support portion 513a of the rubber 510a is elastically deformed and bent, and the movable portion 512a is displaced in the -X direction. Thereafter, when the operating member 100 is released, the support portion 513a of the rubber 510a recovers its original shape, so that the movable portion 512a is displaced in the X direction. As a result, the operating member 100, the first slider 200a and the third slider 200c move in the X direction back to their neutral positions.

When the operating member 100 is operated to slide in the X direction from the neutral position, in similar manner to the slide operation in the -X direction of the operating member 100, the first slider 200a and the third slider 200c move in the X direction. At this time, as shown in FIG. 8A, the magnet 611a approaches the magnetic sensor 620a to be aligned with the same in the vertical direction, while the magnet 612a moves away from the magnetic sensor 620a. The magnetic sensor 620a therefore outputs the first output signal in accordance with the magnetic polarity of the magnet 611a. When the first output signal is inputted to the above-mentioned electronic equipment, the slide operation in the X direction of the operating member 100 is detected by the control unit of the electronic equipment. At this time, the associated rubber 510a is compressed as in the slide operation in the -X direction of the operating member 100. Thereafter, when the operating member 100 is released, the rubber 510a recovers its shape to move the operating member 100, the first slider 200a and the third slider 200c in the -X direction back to their neutral positions.

Figure 9:
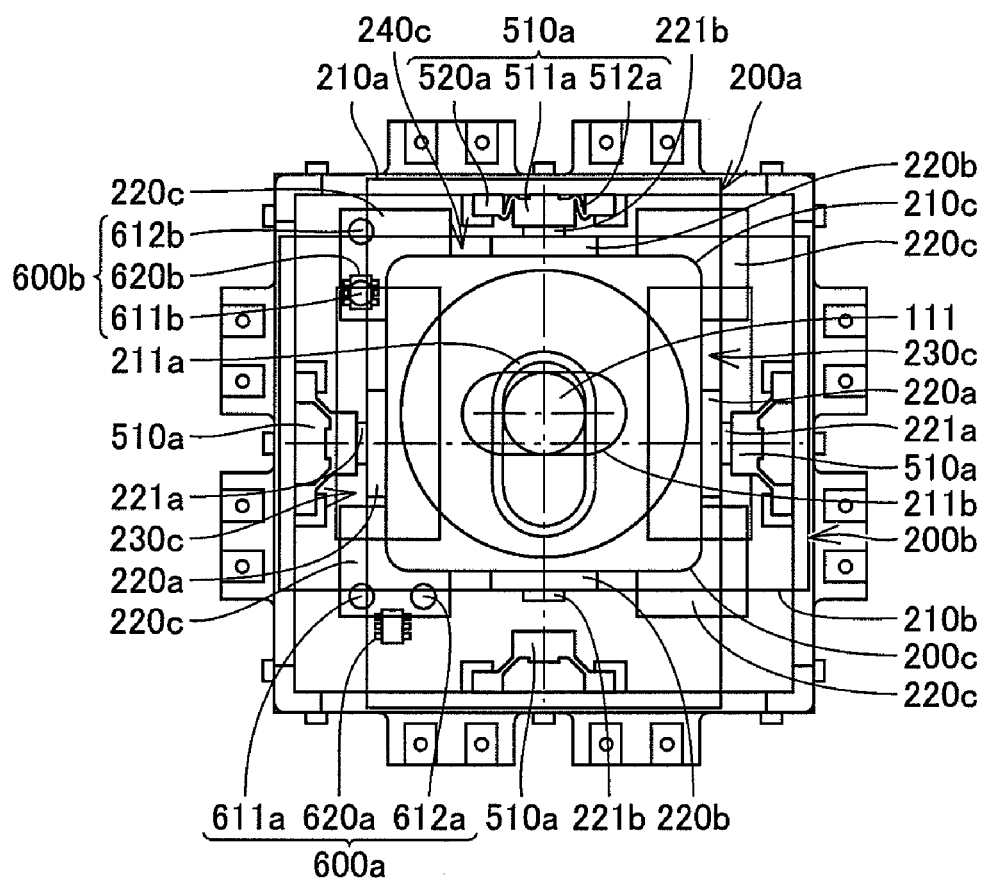
FIG. 9 is a schematic plan view of the input apparatus with the cover removed, showing the first, second, and third sliders transparently, and in a state where the operating member is operated to move in a Y direction.
Figure 10A:
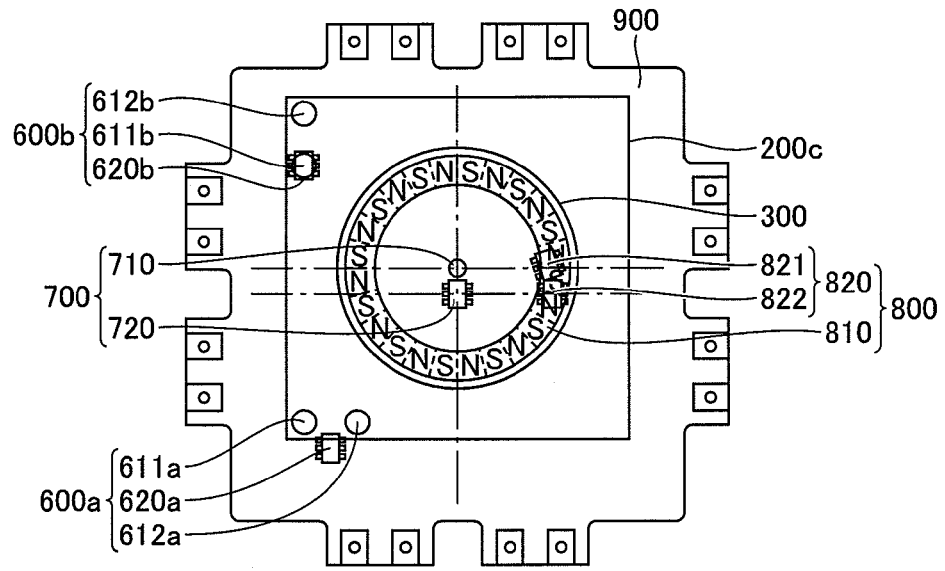
FIG. 10A is a schematic plan view showing the positional relationships between the first, second, third, fourth, fifth and seventh magnets and the first, second, third and fourth magnetic sensors in a state where the operating member is operated to move in the Y direction.

When the operating member 100 is operated to slide in the Y direction from the neutral position as shown in FIG. 9, the second slider 200b and the third slider 200c move in the Y direction. At this time, the box portion 210c of the third slider 200c moves in the Y direction between the pair of arms 220a of the first slider 200a, but the first slider 200a does not move. Along with this, as shown in FIG. 10A, the magnets 611b, 612b of the second slide detector 600b provided in the flange 220c of the third slider 200c move in the Y direction. Specifically, the magnet 611b approaches the magnetic sensor 620b to be aligned with the same in the vertical direction, while the magnet 612b moves away from the magnetic sensor 620b. The magnetic sensor 620b therefore outputs a third output signal in accordance with the magnetic polarity of the magnet 611b. When the third output signal is inputted to the above-mentioned electronic equipment, the slide operation in the Y direction of the operating member 100 is detected by the control unit of the electronic equipment. At this time, as shown in FIG. 9, the rubber 510a is compressed between the arm 220b on the Y direction side of the second slider 200b and the side wall 413 of the body 410, so that the support portion 513a of the rubber 510a is elastically deformed and bent, and the movable portion 512a is displaced in the Y direction. Thereafter, when the operating member 100 is released, the support portion 513a of the rubber 510a recovers its original shape, so that the movable portion 512a is displaced in the -Y direction. As a result, the operating member 100, the first slider 200a and the third slider 200c move in the -Y direction back to the neutral position.

Figure 10B:
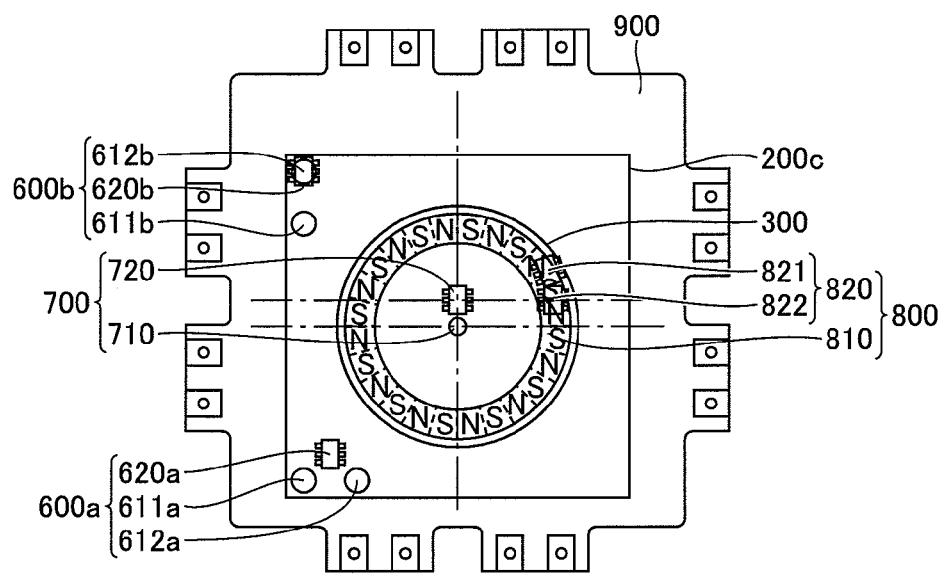
FIG. 10B is a schematic plan view showing the positional relationships between the first, second, third, fourth, fifth and seventh magnets and the first, second, third and fourth magnetic sensors in a state where the operating member is operated to move in the −Y direction.

When the operating member 100 is operated to slide in the -Y direction from the neutral position, in a similar manner to the slide operation in the Y direction of the operating member 100, the second slider 200b and the third slider 200c move in the -Y direction. At this time, as shown in FIG. 10B, the magnet 612b approaches the magnetic sensor 620b to be aligned with the same in the vertical direction, while the magnet 611b moves away from the magnetic sensor 620b. The magnetic sensor 620b therefore outputs the fourth output signal in accordance with the magnetic polarity of the magnet 612b. When the fourth output signal is inputted to the above-mentioned electronic equipment, the slide operation in the -Y direction of the operating member 100 is detected by the control unit of the electronic equipment. At this time, the rubber 510a is compressed as in the slide operation in the Y direction of the operating member 100. Thereafter, when the operating member 100 is released, the rubber 510a recovers its original shape and moves the operating member 100, the second slider 200b and the third slider 200c in the Y direction back to the neutral position.

Figure 11:
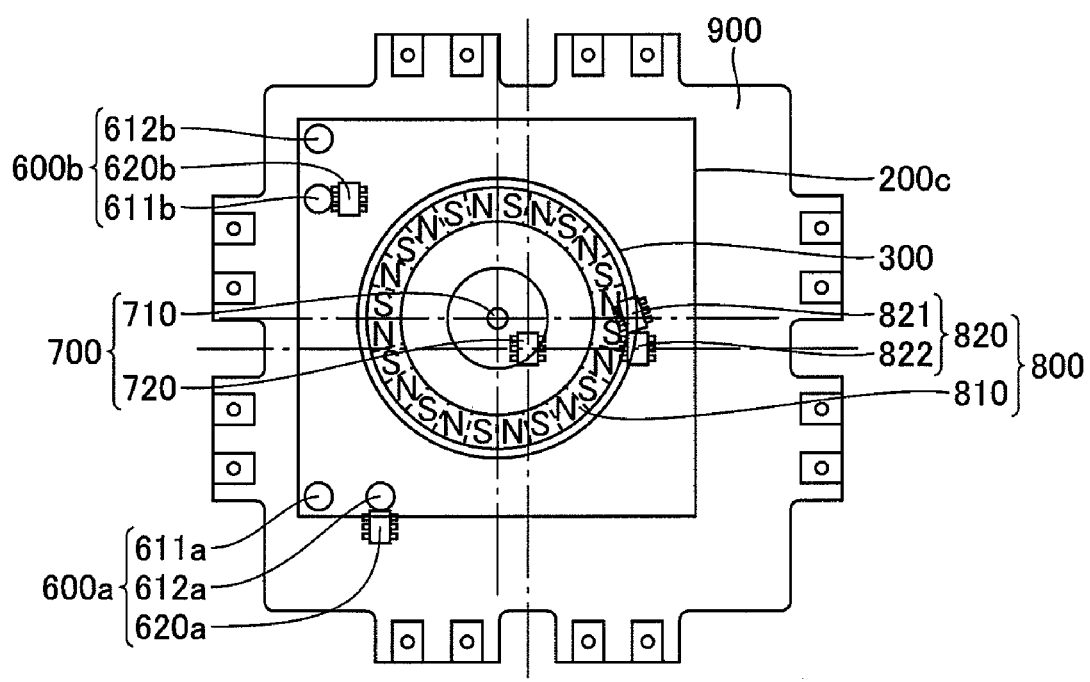
FIG. 11 is a schematic plan view showing the positional relationships between the first, second, third, fourth, fifth and seventh magnets and the first, second, third and fourth magnetic sensors in a state where the operating member is operated to move in a Y and −X direction.

As shown in FIG. 11, when the operating member 100 is operated to slide in a direction between the -X direction and the Y direction (hereinafter referred to as a -XY direction) from the neutral position, the respective elements operate as in the above-described slide operation in the -X direction and in the Y direction, so that the magnet 612a approaches the magnetic sensor 620a, and the magnet 611b approaches the magnetic sensor 620b. Thus, the magnetic sensor 620a outputs a second output signal in accordance with the magnetic polarity of the magnet 612a, and the magnetic sensor 620b outputs a third output signal in accordance with the magnetic polarity of the magnet 611b. When the second and third output signals are inputted to the above-mentioned electronic equipment, the slide operation in the −XY direction of the operating member 100 is detected by the control unit of the electronic equipment.

When the operating member 100 is operated to slide in a direction between the X direction and the Y direction (hereinafter referred to as a XY direction) from the neutral position, the respective elements operate as in the above-described slide operation in the X direction and the Y direction, so that the magnet 611a approaches the magnetic sensor 620a, and the magnet 611b approaches the magnetic sensor 620b. Thus, the magnetic sensor 620a outputs a first output signal in accordance with the magnetic pole of the magnet 611a, and the magnetic sensor 620b outputs a third output signal in accordance with the magnetic polarity of the magnet 611b. When the first and third output signals are inputted to the above-mentioned electronic equipment, the slide operation in the XY direction of the operating member 100 is detected by the control unit of the electronic equipment.

When the operating member 100 is operated to slide in a direction between the X direction and the −Y direction (hereinafter referred to as a X-Y direction) from the neutral position, the respective elements operate as in the above-described slide operation in the X direction and the −Y direction, so that the magnet 611a approaches the magnetic sensor 620a, and the magnet 612b approaches the magnetic sensor 620b. Thus, the magnetic sensor 620a outputs a first output signal in accordance with the magnetic polarity of the magnet 611a, and the magnetic sensor 620b outputs a fourth output signal in accordance with the magnetic polarity of the magnet 612b. When the first and fourth output signals are inputted to the above-mentioned electronic equipment, the slide operation in the X-Y direction of the operating member 100 is detected by the control unit of the electronic equipment.

When the operating member 100 is operated to slide in a direction between the −X direction and the −Y direction (hereinafter referred to as a −X-Y direction) from the neutral position, the respective elements operate as in the above-described slide operation in the −X direction and the −Y direction, so that the magnet 612a approaches the magnetic sensor 620a, and the magnet 612b approaches the magnetic sensor 620b. Thus, the magnetic sensor 620a outputs a second output signal in accordance with the magnetic polarity of the magnet 612a, and the magnetic sensor 620b outputs a fourth output signal in accordance with the magnetic polarity of the magnet 612b. When the second and fourth output signals are inputted to the above-mentioned electronic equipment, the slide operation in the −X-Y direction of the operating member 100 is detected by the control unit of the electronic equipment.

Figure 12:
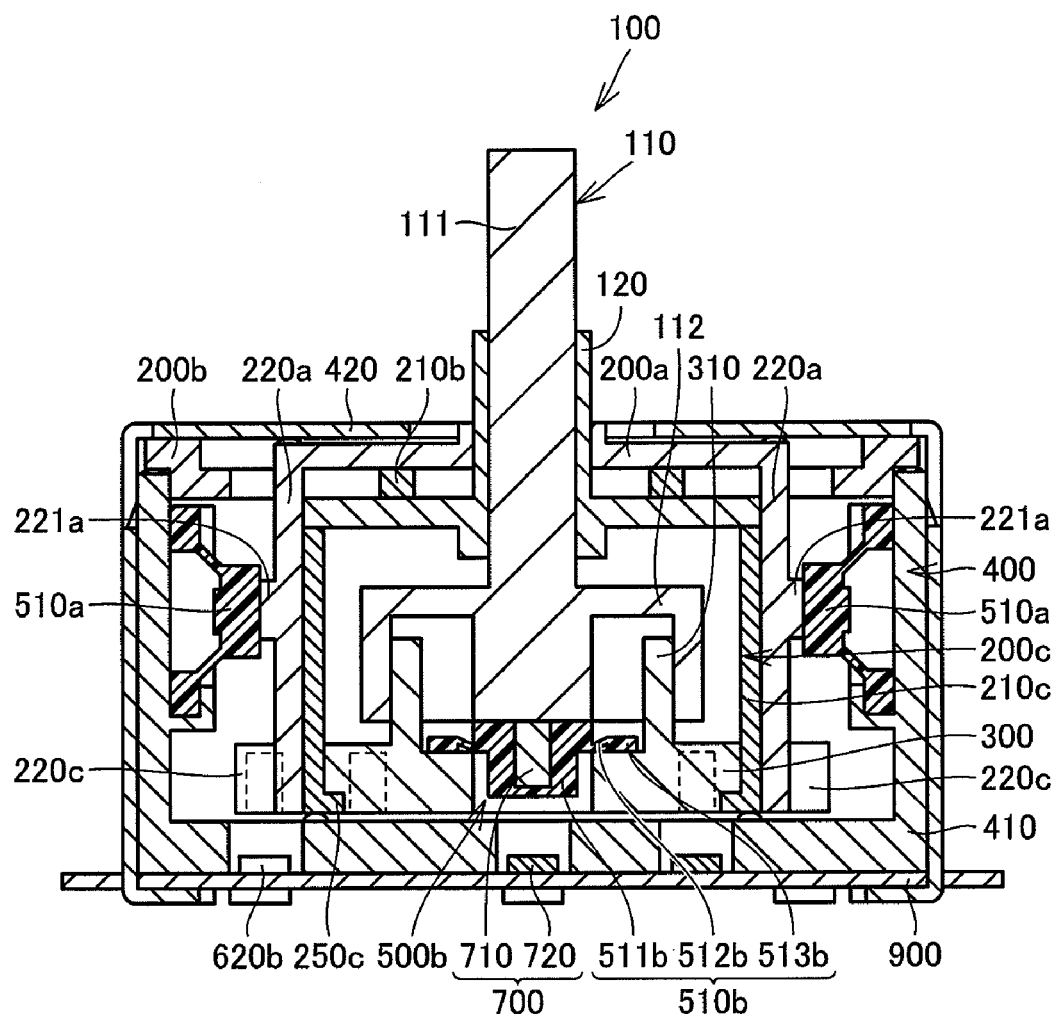
FIG. 12 is a cross-sectional view of the input apparatus, taken along line 1B-1B in FIG. 1A, showing a state where the operating member is press operated in a −Z direction.

When the shaft 110 of the operating member 100 is press operated in the −Z direction from the neutral position as shown in FIG. 12, the shaft 110 moves in the −Z direction to press down the movable portion 512b of the rubber 510b in the −Z direction. The support portion 513b of the rubber 510b is thereby elastically deformed and bent. At this time, the magnet 710 provided in the movable portion 512b approaches the magnetic sensor 720. Consequently, the magnetic sensor 720 outputs a fifth output signal in accordance with the change in the magnetic field due to the movement of the magnet 710. When the fifth output signal is inputted to the above-mentioned electronic equipment, the press operation in the −Z direction of the operating member 100 is detected by the control unit of the electronic equipment. Thereafter, when the operating member 100 is released, the support portion 513b of the rubber 510b recovers its shape, so that the movable portion 512b is displaced in the Z direction and thereby presses the shaft 110 up to the neutral position.

When the shaft 110 of the operating member 100 is operated to rotate in the circumferential direction, the rotating member 300 and the magnet 810 rotate together with the shaft 110. Consequently, the Hall-effect devices 821, 822 of the magnetic sensor 820 detect the change in the magnetic field of the rotating magnet 810 and output sixth and seventh output signals in two phases. When the sixth and seventh output signals are inputted to the above-mentioned electronic equipment, the control unit of the electronic equipment detects the rotation direction of the shaft 110, based on which of the sixth and seventh output signals is inputted first. The control unit also detects the rotation amount of the shaft 110, based on the pulse numbers of the sixth and seventh output signals.

In the above-described input apparatus, the magnetic sensor 620a outputs first and second output signals in accordance with the magnetic polarities of the magnets 611a, 612a which approach the magnetic sensor 620a in the accordance with the slide movement in directions including the components of the X and −X directions of the operating member 100. On the other hand, the magnetic sensor 620b outputs third and fourth output signals in accordance with the magnetic polarities of the magnets 611b, 612b which approach the magnetic sensor 620b in accordance with the slide movement in directions including the components of the Y and −Y directions of the operating member 100. That is, the two magnetic sensors 620a, 620b can detect slide movements in the X, −X, Y, −Y, XY, −X-Y, X-Y, and −XY of the operating member 100, The input device with such configuration has an advantageously smaller number of magnetic sensors, compared with a case where four magnetic sensors are used to detect the slide movement of the operating member 100. Moreover, the slide movement of the operating member 100 is detected by the magnets 611a, 612a, 611b, 612b and the magnetic sensors 620a, 620b, the press movement of the operating member 100 is detected by the magnet 710 and the magnetic sensor 720, and the rotation direction and the rotation amount of the operating member 100 are detected by the magnet 810 and the magnetic sensor 820. As the magnets 611a, 612a, 611b, 612b, 710, 810 (movable parts) are not in contact with the magnetic sensors 620a, 620b, 720, 820 (detectors), the input apparatus does not require electrical connections between the movable parts and the detectors, which prevents deterioration of reliability due to contact failure or the like. This configuration allows the magnetic sensors 620a, 620b, 720, 820 to be mounted on the same circuit board 900. Accordingly, it is possible to reduce the number of components, simplify the configuration of the input apparatus, and thereby reduce the cost of the input apparatus.

In addition, the operating member 100, and the first, second and third sliders 200a, 200b, 200c can be combined simpy by layering the plate 121 of the operating member 100, the slide portion 210b of the second slider 200b, and the slide portion 210a of the first slider 200a on the box portion 210c of the third slider 200c in this order, and thereby bringing the pair of arms 220b of the second slider 200b into abutment with the outer surfaces on the Y and −Y direction sides of the box portion 210c and the plate 121, and bringing the pair of arms 220a of the first slider 200a into abutment with the outer surfaces on the X and −X direction sides of the box portion 210c and the plate 121. Consequently, the ease in combining the operating member 100, and the first, second and third sliders 200a, 200b, 200c advantageously leads to reduction in manufacturing cost of the input apparatus. Moreover, as the lower end portion of the shaft 110, the rotating member 300 and the rubber 510*b* are contained in the box portion 210c of the third slider 200*c*, the height of the input apparatus can be reduced as compared with a case where these elements are arranged in parallel in the Z and –Z direction.

Moreover, as the input apparatus is equipped with the first and second slide detectors 600*a*, 600*b*, the press detector 700, and the rotation detector 800 independently of each other, it is possible to flexibly adjust the dimensions and the positions of the magnets and the magnetic sensors of the first and second slide detectors 600*a*, 600*b*, the press detector 700, and the rotation detector 800 and to adjust the sensitivities of the magnetic sensors flexibly. Furthermore, as the rubbers 510*a* bias the operating member 100 through the first and second sliders 200*a*, 200*b* from the four directions of the X, –X, Y, and –Y, replacement of the rubber 510*a* makes it possible to adjust the force required to operate the operating member 100 and the slide operation stroke of the operating member 100. Moreover, if one or some of the rubbers 510*a* are replaced by a rubber(s) 510*a* with a different biasing force, it is possible to provide different operation feel for operation in a certain direction(s) of the operating member from operation in the other directions.

The input apparatus as described above is not limited to the above-described embodiment, but it can be modified in design as desired within the scope of claims. Specific design changes will be described in detail below.

In the input apparatus of the above embodiment, the operating member 100 is operable to slide in the eight directions. However, the invention will suffice if the operating member 100 is operable to slide at least in two opposite directions. For example, the operating member 100 may be operable to slide in the X and –X directions only. In this case, the input apparatus should include at least the operating member 100 and the first slide detector 600*a*. Obviously, the operating member 100 may be operable to slide in the Y and –Y directions only. Accordingly, the invention will suffice without the configuration enabling the press operation in the –Z direction of the operating member and without the press detector 700. Moreover, the invention will suffice without the configuration enabling the rotation operation in the circumferential direction of the operating member and/or without the rotation detector 800. If it is desirable to limit the operative directions of the operating member 100, the opening 421 of the cover 420 may formed with grooves extending in the operative directions of the operating member 100. For example, in the case where the operating member 100 should be slide operable in four directions, the opening 421 of the cover 420 may be cross-shaped in plan view.

Figure 13:
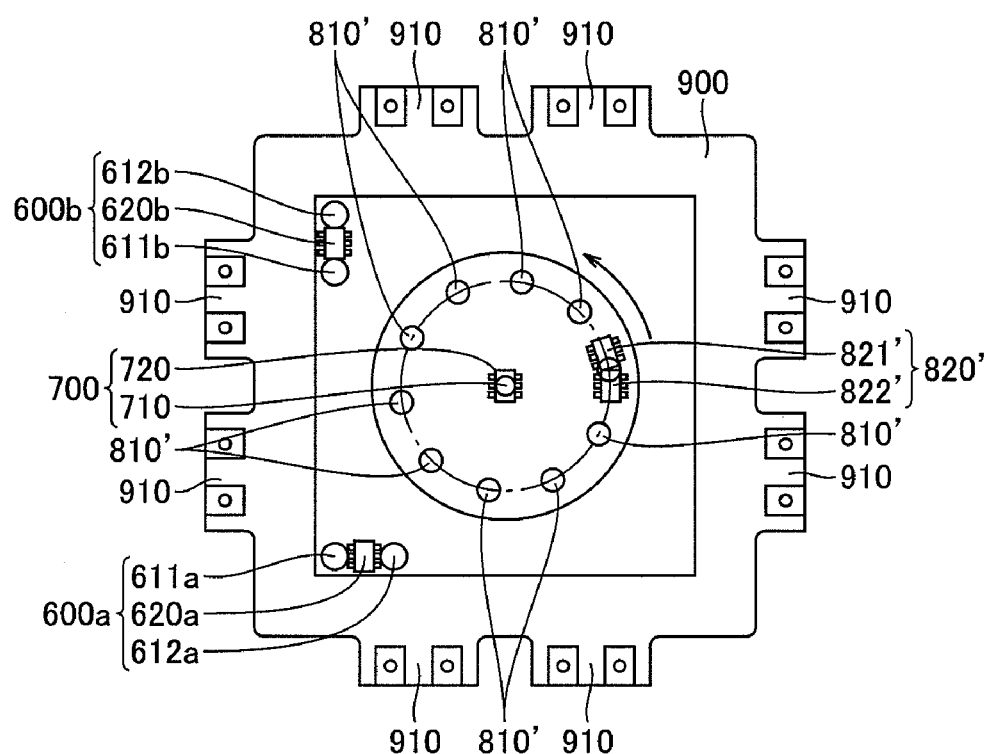
FIG. 13 is a schematic plan view of the input apparatus attached with a plurality of sixth magnets in place of the seventh magnet.

In the above-described embodiment, the magnets 611*a*, 612*a*, 611*b*, 612*b* are disposed in the flanges 220*c* of the third slider 200*c*. However, the magnets 611*a*, 612*a* may be provided in the first slider 200*a*, and the magnets 611*b*, 612*b* may be provided in the second slider 200*b*. In this case, the third slider 200*c* may be omitted. Moreover, the magnets 611*a*, 612*a*, 611*b*, 612*b* may be provided at positions of the operating member 100 corresponding to the X, –X, Y, and –Y directions. In this case, the first, second and third sliders 200*a*, 200*b*, 200*c* may be omitted. Also, the magnets 710, 810 may be provided in the operating member 100. In this case, the rotation body 300 can be omitted. The magnet 810 accordingly to the embodiment is a ring body, but the present invention is not limited thereto. For example, as shown in FIG. 13, a plurality of magnets 810' (sixth magnets) may be arranged with spacing in a ring shape, with their magnetic polarities on the magnetic sensor 820' side being opposite to one another.

Hall-effect devices of polarity detecting type are used for the above-described magnetic sensors 620*a*, 620*b*. However, they may be of any other type as long as they can output the signals in accordance with the magnetic polarities of the magnets 611*a*, 612*a*, 611*b*, 612*b*. For example, fluxgate sensors or the like may be used as the magnetic sensors 620*a*, 620*b*. Moreover, the magnetic sensor 720 may also be a Hall-effect device as in the embodiment or may be any other type as long as it can output a signal in accordance with the change in magnetic field due to the movement of the magnet 710. Some specific examples are a magneto-resistance effect device (MR device), a magneto-resistance effect IC (MRIC). The magnetic sensor 820 of the embodiment has the Hall-effect devices 821, 822, but the present invention is not limited thereto. For example, in the case where the shaft 110 can rotate in only one direction, and only the rotation amount of the shaft 110 is to be detected, the invention requires only one Hall-effect device, or alternatively a magneto-resistance effect device (MR device), a magneto-resistance effect IC (MRIC) or any other device of like kind.

The magnetic sensors 620*a*, 620*b*, 720, 820 may be or may not be mounted on the circuit board 900. The magnetic sensor 620*a* may be arranged at any position that is displaced from the middle point between the first magnet and the second magnet when the operating member is located in the neutral position. Similarly, the magnetic sensor 620*b* may also be arranged at any position that is displaced from the middle point between the third magnet and the fourth magnet when the operating member is located in the neutral position. For example, the magnetic sensor 620*a* may be provided in the side wall 412 of the body 410; more particularly, the magnetic sensor 620*a* may be located at a position in the side wall 412 that is displaced from the middle point between the magnet 611*a* and the magnet 612*a* and equidistant from them when the operating member is in the neutral position. Similarly, the magnetic sensor 620*b* may be provided in the side wall 414 of the body 410; more particularly, the magnetic sensor 620*b* may be located at a position in the side wall 414 that is displaced from the middle point between the magnet 611*b* and the magnet 612*b* and equidistant from them when the operating member is in the neutral position. Also, the magnetic sensor 720 may be disposed at any position on the –Z direction side of the fifth magnet. For example, the magnetic sensor 720 may be provided in the base 511*b* of the rubber 510*b* or in the third slider 200*c*. Moreover, the magnetic sensors 820, 820' may be disposed at any spaced positions that are displaced from a part of the rotation track of the sixth and seventh magnets. For example, the magnetic sensor 820 may be provided in the third slider 200*c*.

In the above-described embodiment, the first slider 200*a* has the pair of arms 220*a* abutting the outer surfaces in the X and –X directions of the box portion 210*c* of the third slider 200*c* and the plate 121 of the operating member 100. However, the first slider 200*a* may be modified to have the pair of arms 220*a* abutting the outer surfaces in the Y and –Y directions of the box portion 210*c* and the plate 121 of the operating member 100. Similarly, the second slider 200*b* may be modified to have the pair of arms 220*b* abutting the outer surfaces in the X and –X directions of the box portion 210*c* of the third slider 200*c* and the plate 121 of the operating member 100. Further, the arms 220*a* may extend through the receiving holes 212*b* of the second slider 200*b* as in the embodiment, but the invention is not limited thereto. Alternatively, the arms 220*a* may be received in recesses formed in the lengthwise ends of the slide portion 210*b* of the second slider 200*b*. Further alternatively, the first slider 200*a* may have a larger with so that the arms 220*a* extend outside the movement range of the second slider 200*b*.

The rubbers 510*a*, 510*b* may be substituted by well-known biasing means such as coil springs and reversing springs. The rubbers 510*a* may be or may not be interposed between the arms 220*a*, 220*b* and the side walls 411, 412, 413, 414. For example, biasing means such as the rubbers 510*a* can be disposed between the third slider and the side walls 411, 412, 413, 414 without interfering with the arms 220*a*, 220*b*. Moreover, in the case where the first, second and third sliders are omitted as described above, the biasing means such as the rubbers 510*a* may be disposed between the operating member 100 and the side walls 411, 412, 413, 414. The rubber 510*b* may be interposed between the shaft 110 and the rotating member 300 as in the embodiment, but the invention is not limited thereto. For example, the rubber 510*b* may be interposed between the shaft 110 and the third slider 200*c* or the circuit board 900.

The above-described input apparatus may modified in design, particularly the shapes, the positions and the numbers of its respective elements, as long as they provide similar functions. The neutral position is defined in the above embodiment as the position where the center of the opening 421 of the cover 420 coincide with the center of the body 111 of the shaft 110. However, the neutral position can be set as appropriate. The X, −X, Y and −Y directions may be ones as defined in the above-described embodiment or may be defined as appropriate.

REFERENCE SIGNS LIST

100 operating member
121 plate
200*a* first slider
210*a* slide portion
220*a* arm
200*b* second slider
210*b* slide portion
220*b* arm
200*c* third slider
210*c* box portion
300 rotating member
400 case
410 body
420 cover
500*a* first neutral position returning mechanism
510*a* rubber (first, second, third, fourth biasing means)
511*a* base
512*a* movable portion
513*a* support portion
500*b* second neutral position returning mechanism
510*b* rubber (fifth biasing means)
511*b* base
512*b* movable portion
513*b* support portion
600*a* first slide detector
611*a* magnet (first magnet)
612*a* magnet (second magnet)
620*a* magnetic sensor (first magnetic sensor)
600*b* second slide detector
611*b* magnet (third magnet)
612*b* magnet (fourth magnet)
620*b* magnetic sensor (second magnetic sensor)
700 press detector
710 magnet (fifth magnet)
720 magnetic sensor (third magnetic sensor)
800 rotation detector
810 magnet (seventh magnet)
820 magnetic sensor (fourth magnetic sensor)
810' magnet (sixth magnet)
820' magnetic sensor (fourth magnetic sensor)
900 circuit board

The invention claimed is:

1. An input apparatus comprising:
an operating member, operable to move in at least X and −X directions from a predetermined neutral position, the X and −X directions being opposite to each other;
first and second magnets, being arranged with spacing along an X and −X direction and having opposite magnetic polarities to each other, wherein when the operating member moves in either one of the X and −X directions, the first and second magnets moves in the same direction as the operating member; and
a first magnetic sensor, provided at a position displaced from a middle point between the first magnet and the second magnet when the operating member is located in the neutral position, the position being equidistant from the first magnet and the second magnet,
wherein when the operating member moves in one of the X and −X directions, the first magnetic sensor outputs a signal in accordance with the magnetic polarity of one of the first and second magnets that approaches the first magnetic sensor.

2. The input apparatus according to claim 1, wherein the operating member is also operable to move from the neutral position in Y and −Y directions that are opposite to each other and perpendicular to the X and −X directions, the input apparatus further comprising:
third and fourth magnets, being arranged with spacing along a Y and −Y direction and having opposite magnetic polarities to each other, wherein when the operating member moves in either one of the Y and −Y directions, the third and fourth magnets moves in the same direction as the operating member; and
a second magnetic sensor, provided at a position displaced from a middle point between the third magnet and the fourth magnet when the operating member is located in the neutral position, the position being equidistant from the third magnet and the fourth magnet,
wherein when the operating member moves in one of the Y and −Y directions, the second magnetic sensor outputs a signal in accordance with the magnetic polarity of one of the third and fourth magnets that approaches the second magnetic sensor.

3. The input apparatus according to claim 2 further comprising:
first, second, third and fourth side walls, arranged on the X, −X, Y and −Y direction sides, respectively, of the operating member; and
first, second, third and fourth biasing means, interposed between the operating member and the first, second, third and fourth side walls, respectively, to bias the operating member to the neutral position.

4. The input apparatus according to claim 2, further comprising:
a first slider, receiving therethrough the operating member, and being movable in the X and −X directions in accordance with the movement in the X and −X directions of the operating member; and
a second slider, receiving therethrough the operating member, and being movable in the Y and −Y directions in accordance with the movement in the Y and −Y directions of the operating member, wherein the first and second magnets are disposed in the first slider with spacing along the X and −X direction, and the third and fourth magnets are disposed in the second slider with spacing along the Y and −Y direction.

5. The input apparatus according to claim 2, further comprising:

a first slider, receiving therethrough the operating member, and being movable in the X and −X directions in accordance with the movement in the X and −X directions of the operating member; and a second slider, receiving therethrough the operating member, and being movable in the Y and −Y directions in accordance with the movement in the Y and −Y directions of the operating member; and a third slider, combined with the first slider in such a manner as to be movable in the Y and −Y directions, and combined with the second slider in such a manner as to be movable in the X and −X directions, wherein the third slider is movable in the X and −X directions in accordance with the movement in the X and −X directions of the first slider and movable in the Y and −Y directions in accordance with the movement in the Y and −Y directions of the second slider, the first and second magnets are disposed in the third slider with spacing along the X and −X direction, and the third and fourth magnets are disposed in the third slider with spacing along the Y and −Y direction.

6. The input apparatus according to claim 4, further comprising:

first, second, third and fourth side walls, arranged on the X, −X, Y and −Y direction sides, respectively, of the operating member;

a first biasing means, interposed between the first side wall and the first slider to bias the first slider in the −X direction;

a second biasing means, interposed between the second side wall and the first slider to bias the first slider in the X direction;

a third biasing means, interposed between the third side wall and the second slider to bias the second slider in the −Y direction; and a fourth biasing means, interposed between the fourth side wall and the second slider to bias the second slider in the Y direction.

7. The input apparatus according to claim 5, further comprising:

first, second, third and fourth side walls, arranged on the X, −X, Y and −Y direction sides, respectively, of the operating member;

a first biasing means, interposed between the first side wall and the first slider to bias the first slider in the −X direction;

a second biasing means, interposed between the second side wall and the first slider to bias the first slider in the X direction;

a third biasing means, interposed between the third side wall and the second slider to bias the second slider in the −Y direction; and a fourth biasing means, interposed between the fourth side wall and the second slider to bias the second slider in the Y direction.

8. The input apparatus according to claim 3, wherein the first, second, third and fourth biasing means each have a base, a movable portion and a support portion, the support portion being provided on the base to support the movable portion, and in accordance with the movement of the operating member, the support portion is elastically deformable to displace the movable portion toward the base.

9. The input apparatus according to claim 6, wherein the first, second, third and fourth biasing means each have a base, a movable portion and a support portion, the support portion being provided on the base to support the movable portion, and in accordance with the movement of the operating member, the support portion is elastically deformable to displace the movable portion toward the base.

10. The input apparatus according to claim 2, wherein the operating member is press operable from the neutral position in a −Z direction perpendicular to the X, −X, Y and −Y directions, the input apparatus further comprising:

a fifth biasing means for biasing the operating member in a Z direction that is opposite to the −Z direction;

a fifth magnet, provided at a −Z direction side end of the operating member or in the fifth biasing means, the fifth magnet being movable in the −Z direction in accordance with the movement in the −Z direction of the operating member; and a third magnetic sensor, disposed on the −Z direction side of the fifth magnet, and adapted to output a signal according to change in a magnetic field of the fifth magnet when the fifth magnet moves in the −Z direction.

11. The input apparatus according to claim 10, wherein the fifth biasing means has a base, a movable portion, and a support portion, the support portion being provided on the base to support the movable portion, and in accordance with the movement of the operating member, the support portion is elastically deformable to displace the movable portion toward the base.

12. The input apparatus according to claim 2, wherein the operating member is operable to rotate in a circumferential direction thereof, the input apparatus further comprising:

a plurality of sixth magnets, having alternating magnetic polarities arranged annularly along the circumferential direction, and being rotatable in accordance with the rotation of the operating member; and a fourth magnetic sensor, disposed at a distance from a part of a rotation track of the sixth magnets and adapted to output a signal in accordance with change in a magnetic field of the six magnets rotated.

13. The input apparatus according to claim 2, wherein the operating member is operable to rotate in a circumferential direction thereof, the input apparatus further comprising:

a seventh magnet, being a ring body magnetized with alternating magnetic polarities along the circumferential direction, and being rotatable in accordance with the rotation of the operating member; and a fourth magnetic sensor, disposed at a distance from a part of a rotation track of the seventh magnet, and adapted to output a signal in accordance with change in a magnetic field of the seventh magnet rotated.

14. The input apparatus according to claim 12, further comprising a rotating member, being rotatable in the circumferential direction in accordance with the rotation of the operating member, wherein the sixth magnets are attached to the rotating member.

15. The input apparatus according to claim 13, further comprising a rotating member, being rotatable in the circumferential direction in accordance with the rotation of the operating member, wherein the seventh magnet is attached to the rotating member.

16. The input apparatus according to claim 5, wherein
the third slider has a box portion of rectangular tubular shape,
the operating member has a generally rectangular plate to be placed on the box portion, the plate having a substantially identical outer shape as that of the box portion,
the second slider has a slide portion, which is to be set on the plate, and a pair of arms provided in the slide portion,
the first slider has a slide portion, which is to be set on the slide portion of the second slider, and a pair of arms provided in its slide portion, and
the arms of the second slider are abuttable on outer surfaces on the Y and −Y direction sides of the box portion and the plate, and the arms of the first slider are abuttable on outer surfaces on the X and −X direction sides of the box portion and the plate; or alternatively, the arms of the second slider are abuttable on outer surfaces on the X and −X direction sides of the box portion and the plate, and the arms of the first slider are abuttable on outer surfaces on the Y and −Y direction sides of the box portion and the plate.

17. The input apparatus according to claim 16, wherein the operating member is press operable from the neutral position in a −Z direction perpendicular to the X, −X, Y and −Y directions, the input apparatus further comprising:
a fifth biasing means for biasing the operating member in a Z direction that is opposite to the −Z direction;
a fifth magnet, provided at a −Z direction side end of the operating member or in the fifth biasing means, the fifth magnet being movable in the −Z direction in accordance with the movement in the −Z direction of the operating member; and
a third magnetic sensor, disposed on the −Z direction side of the fifth magnet, and adapted to output a signal according to change in a magnetic field of the fifth magnet when the fifth magnet moves in the −Z direction.

18. The input apparatus according to claim 17, wherein
the fifth biasing means has a base, a movable portion, and a support portion, the support portion being provided on the base to support the movable portion, and
in accordance with the movement of the operating member, the support portion is elastically deformable to displace the movable portion toward the base.

19. The input apparatus according to claim 16, wherein the operating member is operable to rotate in a circumferential direction thereof, the input apparatus further comprising:
a rotating member, being rotatable in accordance with the rotation of the operating member;
a plurality of sixth magnets, having alternating magnetic polarities arranged annularly along the circumferential direction of the rotating member, and being rotatable in accordance with the rotation of the operating member; and
a fourth magnetic sensor, disposed at a distance from a part of a rotation track of the sixth magnets, and adapted to output a signal in accordance with change in a magnetic field of the six magnets when the sixth magnets rotate, wherein
the operating member further has a shaft that passes through the plate thereof in a rotatable manner in the circumferential direction, and
a −Z direction side end of the shaft and the rotating member are contained in the box portion of the third slider.

20. The input apparatus according to claim 16, wherein the operating member is operable to rotate in a circumferential direction thereof, the input apparatus further comprising:
a rotating member, being rotatable in accordance with the rotation of the operating member;
a seventh magnet of ring shape, magnetized with alternating magnetic polarities along the circumferential direction of the rotating member; and
a fourth magnetic sensor, disposed at a distance from a part of a rotation track of the seventh magnet, and adapted to output a signal in accordance with change in a magnetic field of the seventh magnet when the seventh magnet rotates, wherein
the operating member further has a shaft that passes through the plate thereof in a rotatable manner in the circumferential direction, and
a −Z direction side end of the shaft and the rotating member are contained in the box portion of the third slider.

21. The input apparatus according to claim 17, wherein the operating member is operable to rotate in a circumferential direction thereof, the input apparatus further comprising:
a rotating member, being rotatable in accordance with the rotation of the operating member;
a plurality of sixth magnets, having alternating magnetic polarities arranged annularly along the circumferential direction of the rotating member, and being rotatable in accordance with the rotation of the operating member; and
a fourth magnetic sensor, disposed at a distance from a part of a rotation track of the sixth magnets, and adapted to output a signal in accordance with change in a magnetic field of the six magnets when the sixth magnets rotate, wherein
the operating member further has a shaft that passes through the plate thereof in a rotatable manner in the circumferential direction,
the fifth biasing means is located between the operating member and the rotating member, and
a −Z direction side end of the shaft, the fifth biasing means, and the rotating member are contained in the box portion of the third slider.

22. The input apparatus according to claim 18, wherein the operating member is operable to rotate in a circumferential direction thereof, the input apparatus further comprising:
a rotating member, being rotatable in accordance with the rotation of the operating member;
a plurality of sixth magnets, having alternating magnetic polarities arranged annularly along the circumferential direction of the rotating member, and being rotatable in accordance with the rotation of the operating member; and
a fourth magnetic sensor, disposed at a distance from a part of a rotation track of the sixth magnets, and adapted to output a signal in accordance with change in a magnetic field of the six magnets when the sixth magnets rotate, wherein
the operating member further has a shaft that passes through the plate thereof in a rotatable manner in the circumferential direction,
the fifth biasing means is located between the operating member and the rotating member, and
a −Z direction side end of the shaft, the fifth biasing means, and the rotating member are contained in the box portion of the third slider.

23. The input apparatus according to claim 17, wherein the operating member is operable to rotate in a circumferential direction thereof, the input apparatus further comprising:
a rotating member, being rotatable in accordance with the rotation of the operating member;

a seventh magnet of ring shape, magnetized with alternating magnetic polarities along the circumferential direction of the rotating member; and a fourth magnetic sensor, disposed at a distance from a part of a rotation track of the seventh magnet, and adapted to output a signal in accordance with change in a magnetic field of the seventh magnet when the seventh magnet rotates, wherein the operating member further has a shaft that passes through the plate thereof in a rotatable manner in the circumferential direction, the fifth biasing means is located between the operating member and the rotating member, and a −Z direction side end of the shaft, the fifth biasing means, and the rotating member are contained in the box portion of the third slider.

24. The input apparatus according to claim 18, wherein the operating member is operable to rotate in a circumferential direction thereof, the input apparatus further comprising:

a rotating member, being rotatable in accordance with the rotation of the operating member;

a seventh magnet of ring shape, magnetized with alternating magnetic polarities along the circumferential direction of the rotating member; and a fourth magnetic sensor, disposed at a distance from a part of a rotation track of the seventh magnet, and adapted to output a signal in accordance with change in a magnetic field of the seventh magnet when the seventh magnet rotates, wherein the operating member further has a shaft that passes through the plate thereof in a rotatable manner in the circumferential direction, the fifth biasing means is located between the operating member and the rotating member, and a −Z direction side end of the shaft, the fifth biasing means, and the rotating member are contained in the box portion of the third slider.

25. The input apparatus according to claim 12, further comprising a circuit board provided on the −Z direction side of the operating member, wherein the first, second, third and fourth magnetic sensors are mounted on the circuit board.

26. The input apparatus according to claim 13, further comprising a circuit board provided on the −Z direction side of the operating member, wherein the first, second, third and fourth magnetic sensors are mounted on the circuit board.

27. The input apparatus according to claim 16, further comprising a circuit board provided on the −Z direction side of the operating member, wherein the first, second, third and fourth magnetic sensors are mounted on the circuit board.

* * * * *